(12) United States Patent
Gupta et al.

(10) Patent No.: US 12,033,113 B2
(45) Date of Patent: Jul. 9, 2024

(54) SYSTEM AND METHOD FOR ORDER PROCESSING

(71) Applicant: Grey Orange Inc., Roswell, GA (US)

(72) Inventors: Pareiya Gupta, Gurgaon (IN); Mayank Siotia, Fancy Bazar Guwahati (IN); Varundev Solanki, Vadodara (IN)

(73) Assignee: Grey Orange Inc., Roswell, GA (US)

( * ) Notice: Subject to any disclaimer, the term of this patent is extended or adjusted under 35 U.S.C. 154(b) by 631 days.

(21) Appl. No.: 17/345,752

(22) Filed: Jun. 11, 2021

(65) Prior Publication Data
US 2022/0398528 A1 Dec. 15, 2022

(51) Int. Cl.
| | |
|---|---|
| G06Q 10/087 | (2023.01) |
| B65G 1/137 | (2006.01) |
| G05B 19/418 | (2006.01) |
| G05D 1/00 | (2006.01) |
| G06Q 10/0631 | (2023.01) |

(52) U.S. Cl.
CPC ......... *G06Q 10/087* (2013.01); *B65G 1/1373* (2013.01); *G05B 19/4189* (2013.01); *G05D 1/0212* (2013.01); *G06Q 10/06315* (2013.01); *G05B 2219/50391* (2013.01)

(58) Field of Classification Search
CPC .......... G06Q 10/087; G06Q 10/06315; B65G 1/1373; G05D 1/0212; G05B 19/4189; G05B 2219/50391
See application file for complete search history.

(56) References Cited

U.S. PATENT DOCUMENTS

| | | | |
|---|---|---|---|
| 6,193,160 B1 * | 2/2001 | Zembitski | G06K 17/00 235/487 |
| 9,378,482 B1 * | 6/2016 | Pikler | B65G 1/0492 |
| 11,230,435 B1 * | 1/2022 | Mehta | B65G 1/10 |
| 2012/0150340 A1 * | 6/2012 | Suess | B65G 1/1378 700/216 |
| 2014/0040075 A1 * | 2/2014 | Perry | G06Q 30/0635 705/26.81 |

(Continued)

OTHER PUBLICATIONS

Extended European Search Report issued Nov. 2, 2022 in European Patent Application No. 22178498.6, 11 pages.

(Continued)

*Primary Examiner* — Kyle O Logan
(74) *Attorney, Agent, or Firm* — Oblon, McClelland, Maier & Neustadt, L.L.P.

(57) ABSTRACT

An order processing system includes a plurality of robotic devices, a set of storage systems, an order consolidation system, and a control server. The control server receives a set of orders for an item, determines a cumulative order quantity of the item, and selects a subset of the set of orders to be opened up for consolidation at the order consolidation system. The control server identifies one the storage systems that stores the item as per the cumulative order quantity and assigns the storage system to an operator station for batch picking of the cumulative order quantity. The control server controls a first robotic device to transport the storage system to the operator station, and a second robotic device to collect from the operator station a first portion of the cumulative order quantity and transfer the first portion to a set of order bins associated with the subset of orders.

20 Claims, 12 Drawing Sheets

(56) References Cited

U.S. PATENT DOCUMENTS

| | | | | |
|---|---|---|---|---|
| 2014/0244026 | A1* | 8/2014 | Neiser | B65G 1/1378 |
| | | | | 700/216 |
| 2015/0307278 | A1* | 10/2015 | Wickham | G06Q 10/087 |
| | | | | 700/216 |
| 2016/0031644 | A1* | 2/2016 | Schubilske | B65G 1/1378 |
| | | | | 700/216 |
| 2016/0129587 | A1* | 5/2016 | Lindbo | B65D 21/0209 |
| | | | | 700/218 |
| 2019/0233212 | A1* | 8/2019 | Mountz | B65G 1/137 |
| 2020/0130936 | A1* | 4/2020 | Shekhawat | B25J 9/1664 |
| 2020/0265380 | A1* | 8/2020 | Dubois | G06Q 10/0838 |
| 2020/0272970 | A1* | 8/2020 | Willard, III | G06Q 30/0635 |
| 2020/0279217 | A1* | 9/2020 | Gravelle | G06Q 10/0631 |
| 2020/0317450 | A1* | 10/2020 | Parrott | B65G 1/1373 |
| 2020/0327606 | A1* | 10/2020 | Rajkhowa | G06Q 30/0635 |
| 2021/0269244 | A1* | 9/2021 | Ahmann | B65G 1/0492 |

OTHER PUBLICATIONS

Anonymous: "Batch Picking vs. Wave Picking—What is what?", May 24, 2020 (May 24, 2020), XP055973800, Retrieved from the internet: URL: https://addverb.com/batch-order-picking-vs-wave-order-picking-what-is-what/ [retrieved on Oct. 21, 2022], 3 pages.
Mecalux: "Batch Picking: Definition und Anwendung—Mecalux. de", Jul. 15, 2019 (Jul. 15, 2019), XP055974034, Retrieved from the internet: URL: https://www.mecalux.de/olog/batch-picking-dsfinition [retrieved on Oct. 24, 2022], 4 pages.

\* cited by examiner

SYSTEM AND METHOD FOR ORDER PROCESSING

FIELD

Various embodiments of the disclosure relate generally to management of storage facilities. More specifically, various embodiments of the disclosure relate to system and method for dynamic order processing.

BACKGROUND

Contemporary storage facilities handle a large number of inventory items on a daily basis. The inventory items may be moved out of the storage facility for fulfilment of an order or brought inside the storage facility for replenishment of inventory items. Examples of such inventory items may include groceries, apparels, cosmetics, electronic appliances, or the like. Throughputs of such storage facilities may have a direct bearing on various business metrics such as time taken to complete orders, total number of orders completed within a time duration, customer satisfaction, or the like. Hence, it is necessary to optimize the operations performed at these storage facilities to realize a maximum throughput.

Customarily, the storage facilities store the inventory items on shelves/bins of storage systems. The storage facilities deploy transport vehicles for moving the inventory items or the storage systems between various locations inside the storage facility. In one example, for fulfilment of an order, the transport vehicles may transport one or more storage systems, storing the corresponding inventory items, to an operator station within the storage facility. At the operator station, an operator may perform one or more pick or put actions for processing an order.

However, such manual operations for facilitating fulfilment of the order may face various challenges. For example, multiple transport vehicles transport multiple storage systems from the storage area to the operator area for fulfilment of a single order. Further, for fulfilment of multiple orders, the same storage systems are repeatedly transported back and forth between the storage area and the operator stations thereby causing inconvenience, monetary loss, and wastage of time in fulfilment of the order. Further, requirement of manual work during fulfilment of each order collectively consumes a significant amount of time and may result in a failure to realize a maximum throughput at the storage facility. Thus, such approach is suboptimal and may cause customer dissatisfaction due to delay and errors in order fulfillment.

In light of the foregoing, there exists a need for a technical solution that reduces time consumption and scope of human error in management of inventory items in a storage facility.

SUMMARY

Systems and methods for order processing in a storage facility are provided substantially as shown in, and described in connection with, at least one of the figures and claims. The system includes a plurality of robotic devices, a set of storage systems, an order consolidation system, and a control server. The set of storage systems accommodates a plurality of inventory items and the order consolidation system comprises a first set of order bins in accordance with a defined capacity. The control server is configured to receive a set of orders for a first inventory item of the plurality of inventory items and determine a first cumulative order quantity of the first inventory item for the set of orders. The control server is further configured to select a first subset of orders from the set of orders to be opened up for consolidation at the order consolidation system based on at least the defined capacity of the order consolidation system. The control server is further configured to identify, from the set of storage systems, at least one storage system that stores the first inventory item in accordance with the first cumulative order quantity and assign the identified storage system to an operator station for batch picking of the first cumulative order quantity of the first inventory item from the identified storage system. The control server is further configured to control a first robotic device of the plurality of robotic devices to transport the identified storage system to the operator station for the batch picking. The control server is further configured to control a second robotic device of the plurality of robotic devices to collect from the operator station a first portion of the first cumulative order quantity that is batch picked at the operator station and transfer the collected first portion to the first set of order bins. The first portion of the first cumulative order quantity corresponds to the first subset of orders.

In another embodiment, an order processing method implemented by a control server is provided. A set of orders for a first inventory item of a plurality of inventory items is received and a first cumulative order quantity of the first inventory item is determined for the set of orders, by the control server. The plurality of inventory items are stored in a set of storage systems. From the set of orders, a first subset of orders is selected to be opened up for consolidation at an order consolidation system by the control server based on a defined capacity of the order consolidation system. From a set of storage systems, at least one storage system that stores the first inventory item in accordance with the first cumulative order quantity and assign the identified storage system to an operator station for batch picking of the first cumulative order quantity of the first inventory item from the identified storage system. The control server is further configured to control a first robotic device of the plurality of robotic devices to transport the identified storage system to the operator station for the batch picking. The control server is further configured to control a second robotic device of the plurality of robotic devices to collect from the operator station a first portion of the first cumulative order quantity that is batch picked at the operator station and transfer the collected first portion to the first set of order bins. The first portion of the first cumulative order quantity corresponds to the first subset of orders.

In an embodiment, when the storage system further stores a second inventory item and the set of orders is further associated with the second inventory item, a batch picking of a second cumulative order quantity for the second inventory item is executed at the operator station. A second subset of orders in the set of orders that is in excess to the defined capacity of the order consolidation system remains pending for consolidation. The control circuit is further configured to select the second subset of orders to be opened up for consolidation at the order consolidation system based on successful consolidation of the first subset of orders. The control circuit is further configured to control the order consolidation system to replace the first set of order bins with a second set of order bins upon the successful consolidation of the first subset of orders to open up the second subset of orders for consolidation at the order consolidation system.

In an embodiment, the control circuit is further configured to control the second robotic device to collect a second portion of the first cumulative order quantity along with the first portion from the operator station and transfer the second portion of the cumulative order quantity to the second set of order bins.

In an embodiment, the control server is further configured to control a third robotic device of the plurality of robotic devices to collect a second portion of the first cumulative order quantity from the operator station and transfer the second portion of the first cumulative order quantity to the second set of order bins.

In an embodiment, the control circuity is further configured to select one or more orders from the second subset of orders to be opened up for consolidation at the order consolidation system based on successful consolidation of one or more orders of the first subset of orders. The control circuity is further configured to control the order consolidation system to replace one or more order bins of the first set of order bins with one or more new order bins upon the successful consolidation of the one or more orders of the first subset of orders. The one or more order bins that are replaced are associated with the one or more orders of the first subset of orders that are successfully consolidated.

In an embodiment, the control server selects the first subset of orders further based on a priority level associated with each of the set of orders and/or a time of reception of each of the set of orders by the control server. The control server selects the first subset of orders further based on an availability of the first inventory item.

In an embodiment, the control server is further configured to generate a first path plan for the first robotic device to transport the identified storage system to the operator station. The control server controls the first robotic device based on the determined first path plan. The control server is further configured to generate a second path plan for the second robotic device to collect the first portion of the first cumulative order quantity from the operator station and transfer the collected first portion to the first set of order bins. The control server controls the second robotic device based on the determined second path plan. The control server is further configured to generate a pick-path plan for the operator station. The pick-path plan corresponds to a sequence of pick and place operations performed at the operator station to execute the batch picking of the first inventory item from the storage system.

In an embodiment, the order consolidation system is capable of consolidating a first count of orders simultaneously such that the defined capacity equals the first count.

The batch picking of the first inventory item at the operator stations eliminates the need for the same storage system to be repeatedly transported back and forth between a storage area and the operator station for order consolidation, thereby improving throughput at a storage facility.

These and other features and advantages of the present disclosure may be appreciated from a review of the following detailed description of the present disclosure, along with the accompanying figures in which like reference numerals refer to like parts throughout.

Further areas of applicability of the present disclosure will become apparent from the detailed description provided hereinafter. It should be understood that the detailed description of exemplary embodiments is intended for illustration purposes only and is, therefore, not intended to necessarily limit the scope of the disclosure.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment Certain embodiments of the disclosure may be found in disclosed system and method for dynamic order consolidation within a storage facility. Exemplary aspects of the disclosure provide system and method for dynamic order consolidation.

The methods and systems of the disclosure provide a solution for dynamic order processing in a storage facility. The methods and systems disclosed herein eliminate a requirement of repeatedly transporting storage systems back and forth between storage area and operator stations for each order.

Figure 1:
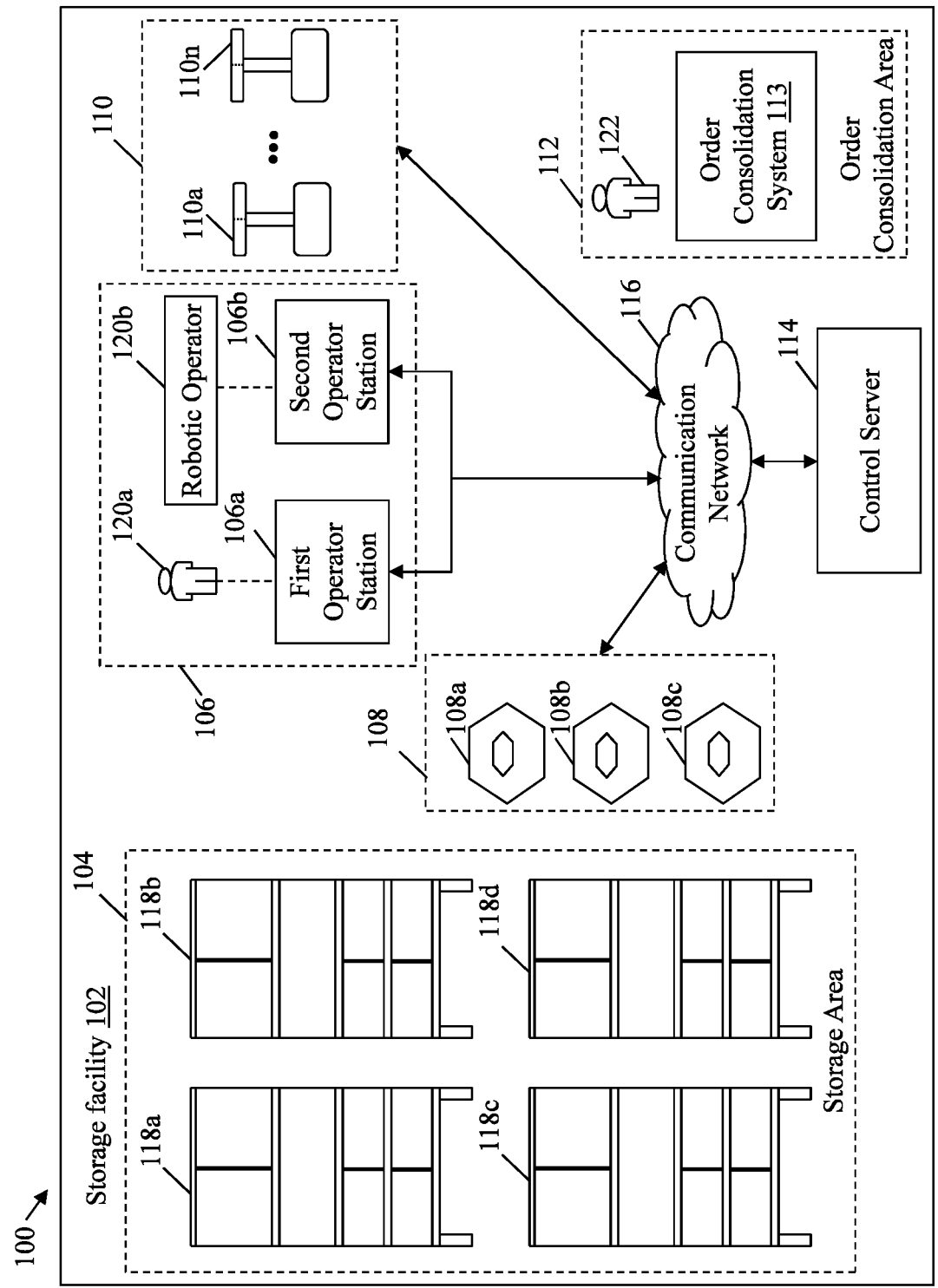
FIG. 1 is a block diagram that illustrates an exemplary environment of a storage facility, in accordance with an exemplary embodiment of the disclosure.

FIG. 1 is a block diagram that illustrates an exemplary environment 100 of a storage facility 102, in accordance with an exemplary embodiment of the disclosure. The storage facility 102 includes a storage area 104, a plurality of operator stations 106, a plurality of transport vehicles 108, a plurality of robotic apparatus 110, an order consolidation area 112, and a control server 114. The control server 114 may communicate with the plurality of operator stations 106, the plurality of transport vehicles 108, and the plurality of robotic apparatus 110 by way of a communication network 116 or through separate communication networks established therebetween.

The storage facility 102 may store multiple inventory items for fulfillment of one or more orders, maintenance of inventory stock, and/or selling of one or more inventory items. Examples of the storage facility 102 may include, but are not limited to, a forward storage facility, a backward storage facility, a fulfillment center, a manufacturing center or a retail store (e.g., a supermarket, an apparel store, or the like). Examples of the inventory items may include, but are not limited to, groceries, apparel, or the like. The inventory items are stored in the storage area 104. The storage area 104 may be of any shape, for example, a rectangular shape. The storage area 104 may include a plurality of storage systems (of which first through fourth storage systems 118a-118d are shown) that are arranged within the storage area 104. Arrangement of the plurality of storage systems in the storage area 104 may be performed in any desired configuration known to those of skill in the art. For example, the plurality of storage systems may be arranged in rows and columns in a way that they form aisles therebetween. Hereinafter, the plurality of storage systems are collectively referred to and designated as "the plurality of storage systems 118".

The plurality of storage systems 118 may be physical storage units, where each storage system may include a plurality of shelves. In an embodiment, each shelf may include various bins/totes placed at different spatial positions to accommodate (or store) various inventory items. Examples of the plurality of storage systems 118 may include, but are not limited to, multi-tier racks, pallet racks, shelves, mobile shelves, mezzanine floors, vertical lift modules, horizontal carousels, conveyors, and vertical carousels. In one embodiment, the plurality of storage systems 118 may have different shapes, sizes, and dimensions. Hereinafter, the terms 'inventory items' and 'items' are used interchangeably.

In one embodiment, the plurality of storage systems 118 are mobile storage systems that are movable from one location to another within the storage facility 102. In such implementation, the movement of the plurality of storage systems 118 may be enabled by the plurality of transport vehicles 108. Each storage system of the plurality of storage systems 118 may further include a reference marker associated therewith for uniquely identifying the corresponding storage system. Examples of the reference marker may include, but are not limited to, a barcode, a quick response (QR) code, a radio frequency identification device (RFID) tag, or the like. It will be apparent to those of skill in the art that the plurality of storage systems 118 may further include additional structural features that aid in movement of the plurality of storage systems 118 within the storage facility 102, without deviating from the scope of the disclosure.

In an embodiment, different items may be stored in different shelves of the plurality of storage systems 118, based on a smart allocation scheme. In a non-limiting example, based on the smart allocation scheme, the items that have a high demand (based on historical order information and/or current order information) or may have higher demand as per demand forecasts, prediction methods, or supply chain sources, may be populated first in the plurality of storage systems 118.

The plurality of operator stations 106 may refer to pick-and-put stations (PPSs) where the inventory items are retrieved from the plurality of storage systems 118 for order fulfilment or inventory items are populated in the plurality of storage systems 118 for replenishment. In one embodiment, at each of the plurality of operator stations 106, the inventory items may be retrieved in batches from the plurality of storage systems 118. Each operator station 106 may be assigned with one or more operators. For example, a first operator station 106a of the plurality of operator stations 106 is assigned with a first operator (for example, a human operator) 120a and a second operator station 106b of the plurality of operator stations 106 is assigned with a second operator 120b (for example, a robotic operator 120b). The robotic operator 120b may correspond a robotic manipulator system that may be configured to execute different operations, such as, pick, hold, grab, transfer, sort, put away, or reverse put inventory items from/to the plurality of storage systems 118. The robotic operator 120b may include one or more robotic arms coupled to one or more end effectors. In certain embodiments, an end effector may be a grabbing or a holding tool detachably attached or affixed to a robotic arm of the robotic operator 120b. Each robotic arm may include different functional portions (e.g., arms), movement of which may be maneuvered by a plurality of actuators to guide the corresponding end effectors to a particular inventory item. The movement of each robotic arm in a 3D space may be restricted by a defined number of degrees of freedom exhibited by different functional portions of the corresponding robotic arm. Different functional portions may be maneuvered based on machine instructions received from the control server 114 based on optimal position parameters of different inventory items relative to a position (i.e., an origin) of the robotic operator 120b.

Although the storage facility 102 is shown to include two operator stations 106a and 106b, it will be apparent to those of skill in the art that the storage facility 102 may include any number of operator stations without deviating from the scope of disclosure.

In an embodiment, each operator station 106 may include a display (e.g., a human machine interface) that receives various commands or instructions from the control server 114 for retrieval of the inventory items from the plurality of storage systems 118. Based on the received commands or instructions, the first operator 120a and the second operator 120b may retrieve the inventory items from the plurality of storage systems 118. An item retrieval operation at an operator station (e.g., the first or second operator station 106a or 106b) may involve batch picking of multiple units of an inventory item from a storage system (e.g., any of the plurality of storage systems 118) and placing the picked units of the inventory item on one or more of the plurality of robotic apparatus 110 or a temporary storage bin at the operator station. In one embodiment, the batch picking of the inventory item may be performed for one or more actual orders and/or one or more forecasted orders of the inventory item. An actual order may refer to an order that is received at the storage facility 102. In one embodiment, an actual order may correspond to an open order that is being consolidated at the order consolidation area 112. In another embodiment, an actual order may correspond to a parked (or queued) order that is pending to be consolidated at the order consolidation area 112. A forecasted order may refer to an order that is not yet received at the storage facility 102 but is predicted to be received based on historical order data. In other words, during the item retrieval operation, a cumulative quantity of an inventory item is picked from a storage system such that units of the inventory item that correspond to the actual orders are placed on one or more robotic apparatus (e.g., any of the plurality of robotic apparatus 110) and remaining units that correspond to the forecasted orders are placed in a temporary storage bin until the forecasted orders convert to actual orders. Multiple item retrieval operations may be performed at each operator station 106 for a single storage system as each storage system may store multiple units of different inventory items. Further, batch picking for all inventory items stored in a single storage system is performed at the same operator station. For example, if a storage system stores first and second inventory items, batch picking of the first and second inventory items for the actual and forecasted orders is implemented at the same operator station. Therefore, the storage system is not required to be moved across different operator stations in the storage facility 102 for batch picking of different inventory items stored in the same storage system.

The plurality of transport vehicles 108 are robotic devices (for example, autonomous mobile robots (AMRs), autonomous guided vehicles (AGVs), or a combination thereof) in the storage facility 102. The plurality of transport vehicles 108 may include suitable logic, instructions, circuitry, interfaces, and/or codes, executable by the circuitry, for automatically transporting payloads (e.g., the plurality of storage systems 118) in the storage facility 102 based on commands received from the control server 114. For example, the plurality of transport vehicles 108 may carry and transport the plurality of storage systems 118 from the storage area 104 to the plurality of operator stations 106. Each transport vehicle 108 may include various sensors (e.g., image sensors, RFID sensors, and/or the like) for determining a relative position thereof within the storage facility 102 and/or identifying the plurality of storage systems 118.

In some embodiments, each transport vehicle 108 may include different functional components, such as a lifting mechanism, an adaptive payload management system, and an autonomous guidance system, by use of which a payload (e.g., a storage system or an inventory palette) may be moved through different locations in the storage facility 102. Each transport vehicle 108 may be equipped with suitable components to enable a multi-floor transfer of goods, for example, a transport vehicle may move within different floors and fulfil the requirements of the control server 114 by picking different storage systems 118 from one floor and transferring it to the plurality of operator stations 106. In addition, each transport vehicle 108 may be configured to adapt to different functional parameters, e.g., payload weight, transfer path, cycle time, or the like, in accordance with seamlessly changing of inventory profiles, demand patterns, and order peaks. Each transport vehicle 108 may be functionally same or different from each other, with possible variations in payload capacity (in pounds (lbs) or kilograms (Kgs)). For the sake of brevity, the storage facility 102 is shown to have three transport vehicles (i.e., a first transport vehicle 108a, a second transport vehicle 108b, and a third transport vehicle 108c). It will be apparent to those of skill in the art that the storage facility 102 may engage any number of transport vehicles without deviating from the scope of the disclosure.

The plurality of robotic apparatus 110 are robotic devices that that move in the storage facility 102 to assist in order consolidation and peripheral tasks. In an example, each robotic apparatus 110a-110n may be an AGV that is responsive to commands received from the control server 114. Each robotic apparatus 110a-110n may include suitable logic, instructions, circuitry, interfaces, and/or codes, executable by the circuitry, for assisting in order consolidation and performing one or more peripheral tasks in the storage facility 102. In one embodiment, each robotic apparatus 110a-110n may be configured to collect one or more units of the inventory items from the plurality of operator stations 106 and transport the received units of the inventory items to the order consolidation area 112 for order consolidation. In another embodiment, each robotic apparatus 110a-110n may be utilized to implement dynamic order consolidation. In such a scenario, a first robotic apparatus 110a assigned to order consolidation of a first order may be moved across the plurality of operator stations 106 to collect inventory items pertaining to the first order from those operator stations 106 where batch picking of the inventory items pertaining to the first order was executed.

It will be apparent to those of skilled in the art that the plurality of robotic apparatus 110 may be configured to perform any peripheral task (e.g., collecting damaged inventory items from the plurality of operator stations 106 and transporting the damaged items to a damaged goods collection area) without deviating from the scope of the disclosure.

Figure 4:
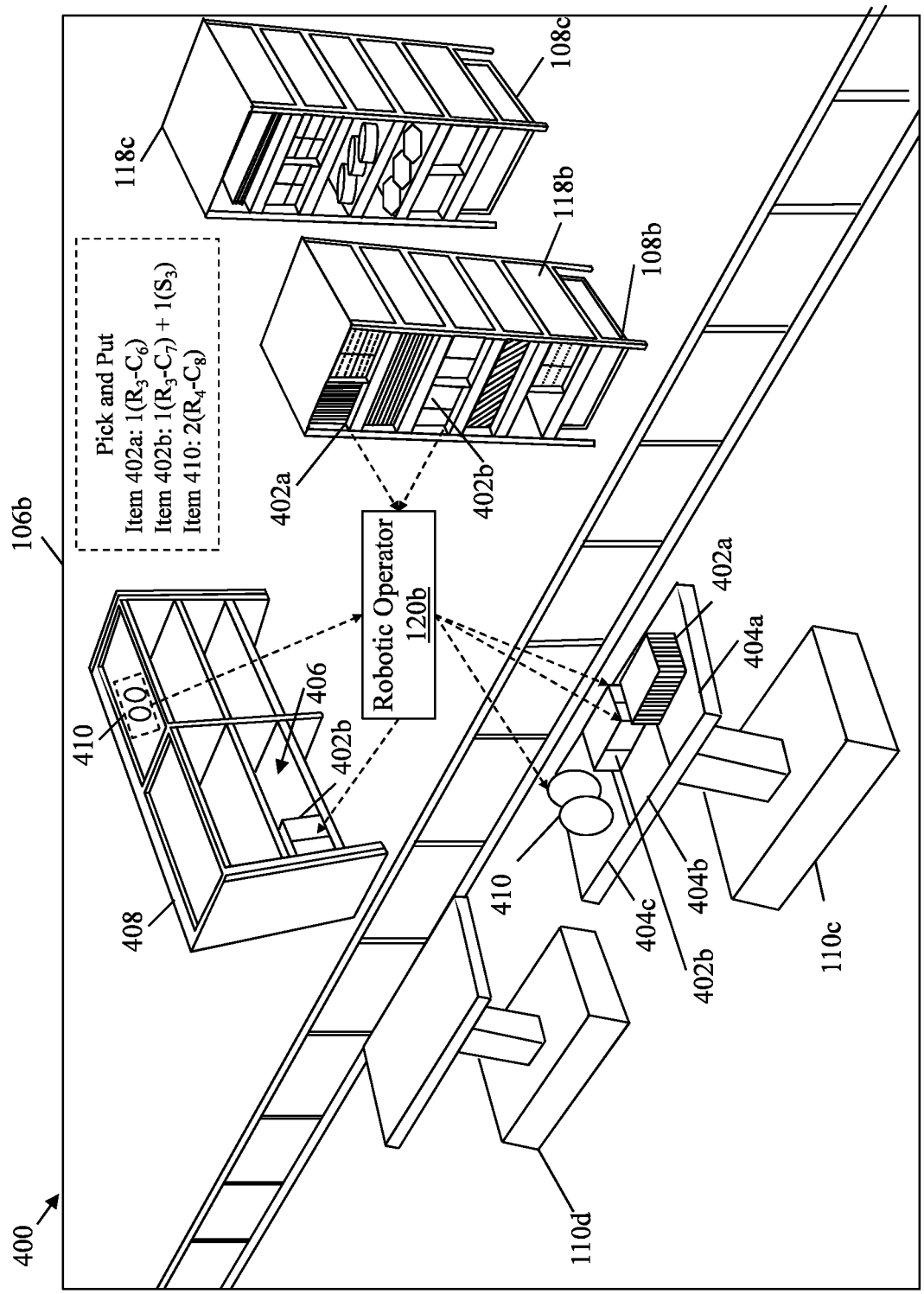
FIG. 4 is a schematic diagram that illustrates another exemplary scenario for batch-picking of inventory items at an operator station of FIG. 1, in accordance with another exemplary embodiment of the disclosure.

The plurality of robotic apparatus 110 may have different sizes and dimensions. Each robotic apparatus 110a-110n may include various sensors (e.g., image sensors, RFID sensors, and/or the like) for determining a relative position thereof within the storage facility 102, identifying the plurality of operator stations 106, and identifying order bins (as shown in FIG. 4) at the order consolidation area 112. Each robotic apparatus 110a-110n may include one or more conveyor belts whose movement enables the corresponding robotic apparatus 110a-110n to transfer the collected inventory items to the order bins. Further, it will be apparent to those of skill in the art that the operations performed by the plurality of robotic apparatus 110 may also be performed by a human operator, or a combination of a robot and a human operator.

In one embodiment, the storage facility 102 may include a dedicated area, i.e., the order consolidation area 112, for consolidating the actual orders. The order consolidation area 112 may include an order consolidation system 113 having a defined capacity for order consolidation. Depending upon the capacity (i.e., the defined capacity) of the order consolidation system 113, a fixed count of actual orders is opened up for consolidation at a given time and the remaining actual orders are parked or queued. In other words, the order consolidation system 113 is capable of consolidating a first count of orders simultaneously such that the defined capacity equals the first count. For example, if the defined capacity of the order consolidation system 113 is 10, from 25 actual orders, 10 actual orders are opened up for consolidation and the remaining 15 orders are parked until the previous 10 orders are successfully consolidated. The order consolidation system 113 includes various order bins/totes in accordance with the defined capacity such that each open order is assigned a dedicated order bin/tote for collecting inventory items corresponding to that order from the plurality of robotic apparatus 110. In an embodiment, a dedicated operator 122 (human or robotic) may allocated to the order consolidation area 112 for inspecting and overseeing various operations being performed in the order consolidation area 112. Order consolidation has been described later in detail in conjunction with FIGS. 3A-3C.

The storage facility 102 may further include a plurality of sensors such as image sensors, RFID sensors, and/or the like, installed at different locations within the storage facility 102. Each of the sensors may be communicably coupled to the control server 114 via the communication network 116.

In an embodiment, the sensors may be mounted on walls of the storage facility 102. In other embodiment, the sensors may be mounted on the plurality of storage systems 118 and/or the temporary storage bins. In other embodiment, the sensors may be mounted on the plurality of transport vehicles 108 and/or the plurality of robotic apparatus 110.

In an embodiment, the sensors may periodically communicate data to the control server 114. In another embodiment, the sensors may be configured to transmit the data upon being prompted by the control server 114. In another embodiment, the sensors may be configured to transmit the data upon detecting a movement associated with one or more inventory items, the plurality of transport vehicles 108, the plurality of storage systems 118, the first operator 120a and the second operator 120b, the plurality of robotic apparatus 110, or any other object in the storage facility 102. In an embodiment, each of the sensors may be configured to track the first operator 120a and the second operator 120b, the plurality of storage systems 118, the order bins, the plurality of robotic apparatus 110, and/or the plurality of transport vehicles 108 in order to capture movement of the inventory items during pick or put sessions.

The control server 114 may be a network of computers, a software framework, or a combination thereof, that may provide a generalized approach to create the server implementation. Examples of the control server 114 may include, but are not limited to, personal computers, laptops, minicomputers, mainframe computers, any non-transient and tangible machine that can execute a machine-readable code, cloud-based servers, distributed server networks, or a network of computer systems. The control server 114 may be realized through various web-based technologies such as, but not limited to, a Java web-framework, a .NET framework, a personal home page (PHP) framework, or any web-application framework. The control server 114 may be maintained by a storage facility management authority or a third-party entity that facilitates inventory management operations for the storage facility 102. The control server 114 may be part of an automated warehouse management system (WMS), which may be a standalone system. Alternatively, the control server 114 may be integrated with the automated WMS. In certain embodiments, the control server 114 may be integrated with supply chain systems and/or integrated enterprise resource planning (ERP) systems. It will be apparent to a person of ordinary skill in the art that the control server 114 may perform various storage facility management operations as well along with inventory tracking and management operations.

The communication network 116 may include suitable logic, circuitry, and interfaces that may be configured to provide a plurality of network ports and a plurality of communication channels for transmission and reception of data related to operations of various entities (such as the plurality of transport vehicles 108, the plurality of robotic apparatus 110, and the control server 114) in the system environment 100. Each network port may correspond to a virtual address (or a physical machine address) for transmission and reception of the communication data. For example, the virtual address may be an Internet Protocol Version 4 (IPV4) (or an IPV6 address) and the physical address may be a Media Access Control (MAC) address. The communication network 116 may be associated with an application layer for implementation of communication protocols based on one or more communication requests from at least one of the one or more communication devices (e.g., I/O devices). The communication data may be transmitted or received, via the communication protocols. Examples of the communication protocols may include, but are not limited to, Hypertext Transfer Protocol (HTTP), File Transfer Protocol (FTP), Simple Mail Transfer Protocol (SMTP), Domain Network System (DNS) protocol, Common Management Interface Protocol (CMIP), Transmission Control Protocol and Internet Protocol (TCP/IP), User Datagram Protocol (UDP), Long Term Evolution (LTE) communication protocols, or any combination thereof.

In one embodiment, the communication data may be transmitted or received via at least one communication channel of a plurality of communication channels in the communication network 116. The communication channels may include, but are not limited to, a wireless channel, a wired channel, a combination of wireless and wired channel thereof. The wireless or wired channel may be associated with a data standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a metropolitan area network (MAN), a satellite network, the Internet, a fiber optic network, a coaxial cable network, an infrared (IR) network, a radio frequency (RF) network, and a combination thereof.

In operation, at a particular time point, the control server 114 may be configured to receive a set of orders and order information of the set of orders from an order management server (not shown). The order management server may be part of a supply chain system of the storage facility 102 or may be integrated with an ERP system implemented at storage facility level or at a storage facility cluster level. The order information may include, but is not limited to, product information (such as, product descriptions, attributes, locations, order quantities) for one or more inventory items, a count of units required for each inventory item, or the like. Based on the received order information, the control server 114 may be configured to update order data stored in a memory of the control server 114. The order data may be indicative of historical order information and the order information of the actual orders received by the control server 114. The control server 114 may be configured to forecast orders for a defined future time period (e.g., 4 hours, one day, two days, or the like) based on the historical order information and the actual order information in the order data. The control server 114 may utilize one or more prediction and forecast algorithms to predict the future orders. The control server 114 may be further configured to parse the actual and forecasted orders to obtain a list of inventory items, for example, a first inventory item. Hereinafter, the terms "first inventory item" and "first item are used interchangeably.

The control server 114 may be further configured to determine a first cumulative order quantity of the first inventory item based on data corresponding to the actual orders and the forecasted orders. The first cumulative order quantity for the first inventory item may indicate a total count of units of the first inventory item required by the actual orders and the forecasted orders. The determination of the first cumulative order quantity may be based on a count of actual orders received by the control server 114 for the first inventory item and a count of forecasted orders expected to be received by the control server 114 for the first inventory item.

The control server 114 may be further configured to select a first subset of orders from the set of orders to be opened up for consolidation at the order consolidation system 113 based on at least the defined capacity of the order consolidation system 113. A second subset of orders in the set of orders that is in excess to the defined capacity of the order consolidation system 113 remains pending for consolidation.

The control server 114 may be further configured to identify, from the plurality of storage systems 118, at least one storage system (e.g., the first storage system 118*a*) that stores the first inventory item in accordance with the first cumulative order quantity. The control server 114 may be further configured to assign the identified first storage system 118*a* to an operator station (e.g., the first operator station 106*a*) of the plurality of operator stations 106 for batch picking of the first cumulative order quantity of the first inventory item from the first storage system 118*a*.

The control server 114 may be further configured to communicate the first cumulative order quantity for the first inventory item to the first operator station 106*a* to facilitate a batch picking of the first cumulative order quantity at the first operator station 106*a*. In an embodiment, the control server 114 may generate a pick-path plan for the first operator station 106*a*. The pick-path plan may correspond to a sequence of pick and place operations performed at the first operator station 106*a* to execute the batch picking of the first inventory item from the first storage system 118*a*. The control server 114 may further communicate the pick-path plan to the first operator station 106*a*.

The control server 114 may be further configured to control one or more of the plurality of transport vehicles 108 to transport the first storage system 118*a* storing the first inventory item to the first operator station 106*a* for the batch picking operation. For example, the control server 114 may generate a first path plan for the first transport vehicle 108*a* to transport the first storage system 118*a* to the first operator station 106*a*. The first path plan may include reference marker details of the first storage system 118*a* and details of one or more paths that are to be traversed by the first transport vehicle 108*a* for transporting the first storage system 118*a* to the first operator station 106*a*. The control server 114 may control the first transport vehicle 108*a* based on the determined first path plan. To control the first transport vehicle 108*a*, the control server 114 may communicate a transit instruction, including the first path plan, to the first transport vehicle 108*a*.

The control server 114 may be further configured to control one or more of the plurality of robotic apparatus 110 to collect a first portion of the first cumulative order quantity that is batch picked at the first operator station 106*a* and transfer the collected first portion to a set of order bins at the order consolidation system 113. The first portion of the first cumulative order quantity may correspond to the first subset of orders that are opened up for consolidation at the order consolidation system 113. The control server 114 may generate a second path plan for the first robotic apparatus 110*a* to collect the first portion of the first cumulative order quantity from the first operator station 106*a* and transfer the collected first portion to the set of order bins at the order consolidation system 113. The second path plan may include path details of one or more paths that are to be traversed by the first robotic apparatus 110*a* for collecting the first portion of the first cumulative order quantity from the first operator station 106*a* and reference marker details of the set of order bins where the collected first portion of the first inventory item is to be transferred for order consolidation. The control server 114 may control the first robotic apparatus 110*a* based on the determined second path plan. To control the first robotic apparatus 110*a*, the control server 114 may communicate a transit instruction, including the second path plan, to the first robotic apparatus 110*a*. In an embodiment, the control server 114 may further control the first robotic apparatus 110*a* to collect a second portion of the first cumulative order quantity along with the first portion from the first operator station 106*a*.

Based on the pick-path plan and information pertaining to the first cumulative order quantity, the first operator 120*a* at the first operator station 106*a* may execute batch picking of the first inventory item from the first storage system 118*a*. The first operator 120*a* may further place the first portion of the cumulative order quantity on the first robotic apparatus 110*a*. In an embodiment, the first operator 120*a* may further place the second portion of the first cumulative order quantity on the first robotic apparatus 110*a*. Upon collecting the first portion (and the second portion) of the first cumulative order quantity, the first robotic apparatus 110*a* may leave the first operator station 106*a* and travel towards the order consolidation area 112. Upon reaching the order consolidation area 112, the first robotic apparatus 110*a* may be configured to transfer the collected first portion to the set of order bins at the order consolidation system 113 as per the second path plan. The control server 114 may be further configured to select the second subset of orders to be opened up for consolidation at the order consolidation system 113 based on successful consolidation of the first subset of orders.

In an embodiment, the first robotic apparatus 110*a* may get parked in the order consolidation area 112 until the second subset of orders open up for consolidation at the order consolidation system 113. When the control server 114 opens up the second subset of orders, the first robotic apparatus 110*a* may transfer the collected second portion of the first cumulative order quantity to a new set of order bins associated with the second subset of orders.

In an embodiment, when the first storage system 118*a* further stores a second inventory item and the set of orders is further associated with the second inventory item, a batch picking of a second cumulative order quantity of the second inventory item may be executed at the first operator station 106*a* along with the batch picking of the first cumulative order quantity for the first inventory item.

In another embodiment, where the storage facility 102 does not have a dedicated area for order consolidation, the control server 114 may be configured to control the plurality of robotic apparatus 110 to execute order consolidation on the go. For example, the control server 114 may be configured to assign one or more order bins/totes to each robotic apparatus 110*a*-110*n* for order consolidation such that each order bin is associated with a specific order. The control server 114 may further instruct each robotic apparatus 110*a*-110*n* to collect requisite units of the inventory items corresponding to the assigned order from the plurality of operator stations 106. Upon completion of the order, the control server 114 may further instruct each robotic apparatus 110*a*-110*n* to transport the completed order to a packaging area (not shown). For enabling the plurality of robotic apparatus 110 to collect the requisite units of the inventory items from the plurality of operator stations 106, the control server 114 may communicate transit instructions to the plurality of robotic apparatus 110. Each transit instruction may include reference marker details of those operator stations 106 from where inventory items are to be collected, path details of one or more paths that are to be traversed by each robotic apparatus 110*a*-110*n* for collecting the requisite inventory items from the plurality of operator stations 106, or the like.

In an embodiment, the control server 114 may be further configured to store, in a memory of the control server 114, a virtual map of the storage facility 102 and inventory storage data of the inventory stock. The virtual map may be indicative of the current location of the plurality of storage systems 118, entry and exit points of the storage facility 102, various reference markers in the storage facility 102, current locations of the plurality of transport vehicles 108 and the plurality of robotic apparatus 110, or the like. The inventory storage data may be indicative of associations between the inventory items stored in the storage facility 102 and the plurality of storage systems 118 in the storage facility 102. The inventory storage data may further include historic storage locations of each inventory item. The inventory storage data further includes parameters (for example, weight, shape, size, color, dimensions, or the like) associated with each inventory item. Embodiments of various components of the control server 114 and their functionalities are described later in conjunction with FIG. 6.

Figure 2A:
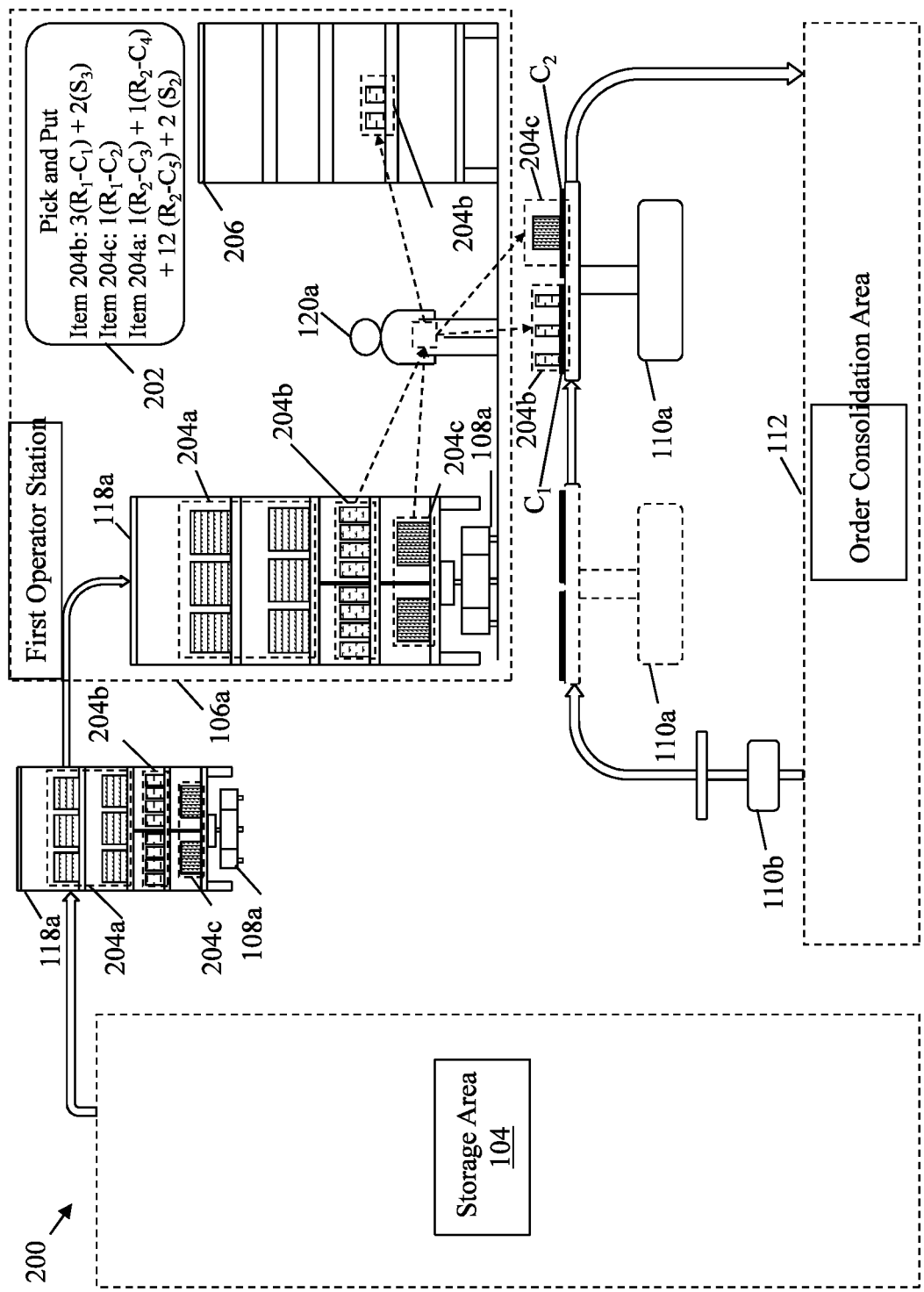
FIGS. 2A and 2B are schematic diagrams that collectively illustrate an exemplary scenario for batch-picking of inventory items at an operator station of FIG. 1, in accordance with an exemplary embodiment of the disclosure.
Figure 2B:
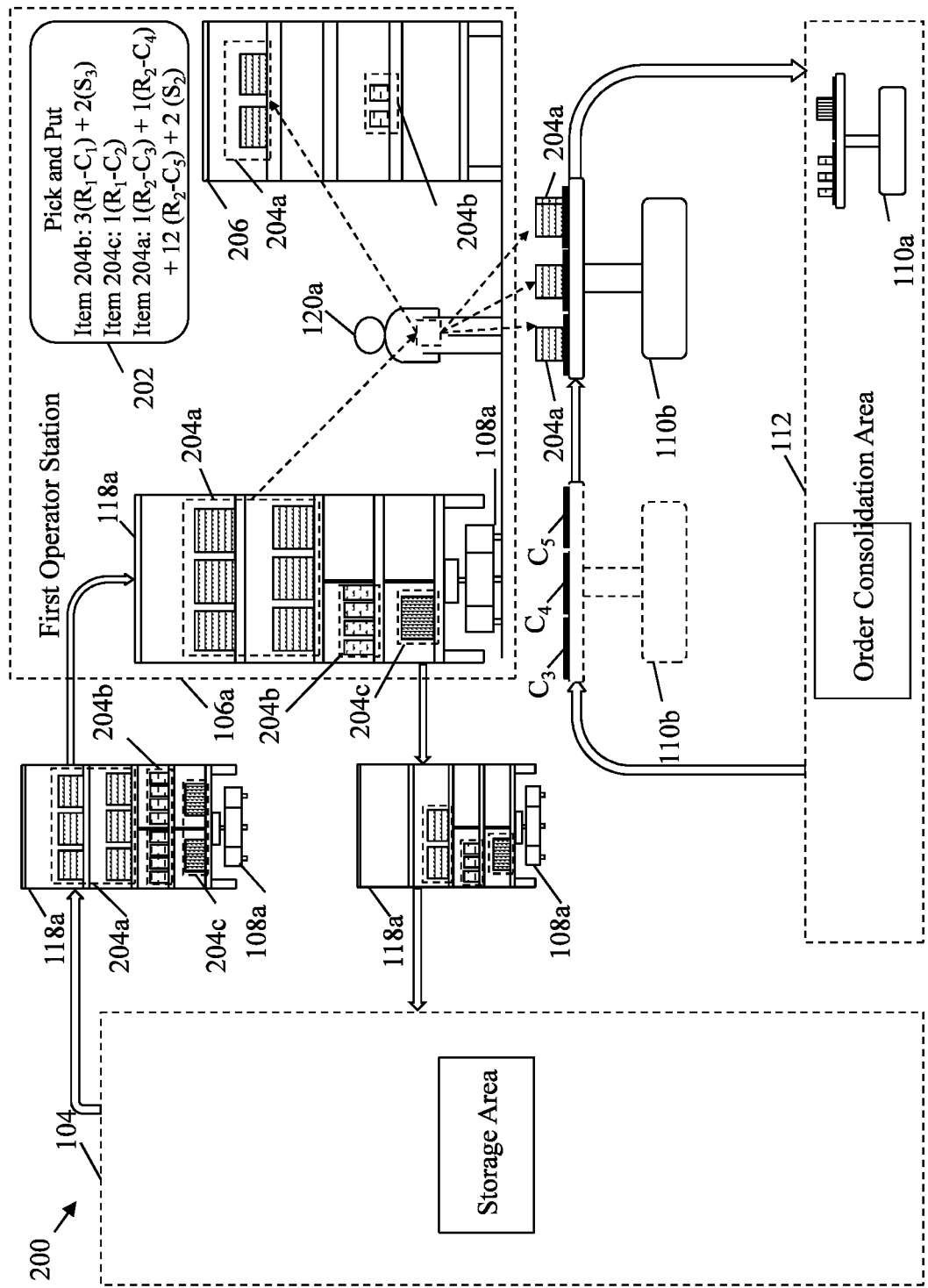

FIGS. 2A and 2B are schematic diagrams that collectively illustrate an exemplary scenario 200 for batch-picking of inventory items at the first operator station 106a, in accordance with an exemplary embodiment of the disclosure. The exemplary scenario 200 is explained with respect to a goods-to-person implementation.

The control server 114 may receive a set of orders (e.g., three actual orders) for a set of inventory items. In an example, a first actual order in the set of orders may be indicative of one unit of a first item and three units of a second item. A second actual order in the set of actual orders may be indicative of one unit of the first item and three units of a third item. A third actual order in the set of actual orders may be indicative of ten units of the first item. The control server 114 may be further configured to utilize the order data pertaining to the historical orders to forecast future orders, e.g., two forecasted orders. A first forecasted order may be indicative of one unit of the first item and two units of the second item. A second forecasted order may be indicative of one unit of the first item.

The control server 114 may be further configured to determine (or estimate) a cumulative order quantity of each inventory item associated with the actual and forecasted orders. As per the previous example, first through third cumulative order quantities for the first through third items as determined by the control server 114 may be '14', '5', and '3', respectively.

The control server 114 may be further configured to select a first subset of orders from the set of orders to be opened up for consolidation at the order consolidation system 113 based on the defined capacity of the order consolidation system 113. A second subset of orders in the set of orders that is in excess to the defined capacity of the order consolidation system 113 remains pending for consolidation. For example, when the defined capacity of the order consolidation system 113 is two, two of the three actual orders are selected to be opened up for consolidation at the order consolidation system 113 and the one order that is in excess to the defined capacity remains pending for consolidation until any of the previous opened orders is successfully consolidated.

In an embodiment, the control server 114 may select the first subset of orders from the set of orders based on a priority level associated with each order of the set of orders. For example, the first and third orders may have a higher priority level as compared to the second order. In such a scenario, the control server 114 selects the first and third orders to be opened up for consolidation prior to the second order and queues or parks the second order.

In another embodiment, the control server 114 may select the first subset of orders from the set of orders based on a time of reception of each order of the set of orders by the control server 114. For example, the first order may be received at "10:00 AM", the second order may be received at "10:15 AM", and the third order may be received at "10:30 AM". In such a scenario, the control server 114 selects the first and second orders to be opened up for consolidation prior to the third order and queues or parks the third order.

In another embodiment, the control server 114 may select the first subset of orders from the set of orders based on an availability of inventory items associated with the set of orders. For example, when inventory items of the second and third orders are available and one of the inventory items associated with the first order is unavailable at a current time, the control server 114 selects the second and third orders to be opened up for consolidation prior to the first order and parks or queues the first order.

In another embodiment, the control server 114 may select the first subset of orders from the set of orders based on a compatibility of inventory items across different orders. For example, the first order may be associated with eatables and the second order may be associated with pesticide products. In such a scenario, the control server 114 may not open the first and second orders simultaneously, and may only open one of the first order and the second order for consolidation due to incompatibility of eatables and pesticide products.

In another embodiment, the control server 114 may select the first subset of orders from the set of orders based on a compatibility of inventory items across the same order. For example, the first order may be for eatables and floor cleaning detergent. In such a scenario, the eatables and the floor cleaning detergent may be required to be consolidated in different order bins. Therefore, two order bins may be required for consolidating the first order, and when the defined capacity of the order consolidation system 113 is two, the control server 114 may only select the first order to be opened up for consolidation in two separate order bins and park the second and third orders.

It will be apparent to a person of ordinary skill in the art that the abovementioned examples for selecting the first subset of orders from the set of orders is illustrative purpose and should not be construed limiting to the scope of the disclosure. In another embodiment, the control server 114 may select the first subset of orders based on a combination of factors described in the foregoing description. Thus, a cumulative order quantity for an inventory item may include a first portion for open orders, a second portion for parked orders, and/or a third portion for forecasted orders. For example, the first cumulative order quantity '14' of the first item includes a portion for open orders (i.e., '2'), a portion for parked orders (i.e., '10'), and a portion for forecasted orders (i.e., '2'). The second cumulative order quantity '5' of the second item includes a portion for open orders (i.e., '3'), a portion for forecasted orders (i.e., '2'), and no portion for parked orders. The third cumulative order quantity '3' of the third item includes a portion for open orders (i.e., '3') and no portions for forecasted or parked orders.

The control server 114 may be further configured to refer to the inventory storage data to select one or more optimal storage systems in the storage area 104 that store the first through third items in accordance with the first through third cumulative order quantities. In one example, the control server 114 may detect the first item is stored in the first and second storage systems 118a and 118b such that the first storage system 118a stores "20" units of the first item and the second storage system 118b stores "10" units of the first item. The control server 114 may detect that the second item is stored in the first and third storage systems 118a and 118c such that the first storage system 118a stores "8" units of the second item and the third storage system 118c stores "15" units of the second item. The control server 114 may further detect that the third item is only stored in the first storage system 118a. Since the first storage system 118a stores the first through third items in accordance with the first through third cumulative order quantities, the control server 114 may identify the first storage system 118a to be optimal for batch picking of the first through third items. However, in another example, if none of the plurality of storage systems 118 stores all three inventory items, the control server 114 may select multiple storage systems for the batch picking operation of the first through third items. In some embodiments, a single storage system may not store the first item as per the first cumulative order quantity. In such a scenario, multiple storage system storing the first item as per the first cumulative order quantity may be selected by the control server 114 as optimal. In a non-limiting example, it is assumed that the control server 114 identifies the first storage system 118a that has the first through third items stored therein.

The control server 114 may further determine an optimal operator station from the plurality of operator stations 106 that is available to execute the batch-picking operations for the first through third items. In an embodiment, the control server 114 may determine the optimal operator station based on an availability factor and a throughput factor of each operator station. For example, the control server 114 may observe that the second operator station 106b is engaged in another batch picking operation and the first operator station 106a is available at the current time instance. In such a scenario, the control server 114 may select the first operator station 106a. The control server 114 may be further configured to assign the first storage system 118a to the first operator station 106a for the batch picking of the first through third cumulative order quantities of the first through third inventory items.

The control server 114 may further select one of the plurality of transport vehicles 108 to transport the first storage system 118a from the storage area 104 to the first operator station 106a based on an availability factor of the plurality of transport vehicles 108, a capacity of the plurality of transport vehicles 108, a current location of the plurality of transport vehicles 108, or the like. In one example, the control server 114 may determine that the first transport vehicle 108a is located nearest to the first storage system 118a and is currently available. In such a scenario, the control server 114 may select the first transport vehicle 108a to transport the first storage system 118a. In another example, the control server 114 may determine that the second transport vehicle 108b is located nearest to the first storage system 118a and is currently available, however the load capacity of the second transport vehicle 108b is insufficient to transport the first storage system 118a. In such a scenario, the control server 114 may identify a second nearest transport vehicle (e.g., the first transport vehicle 108a) that is not only currently available but also has the load capacity to handle the first storage system 118a. In a non-limiting example, it is assumed that the control server 114 selects the first transport vehicle 108a for transporting the first storage system 118a.

The control server 114 may be configured to generate a first path plan for the first transport vehicle 108a to transport the first storage system 118a to the first operator station 106a. The first path plan may be indicative of a first optimal path to reach a location of the first storage system 118a from a current location of the first transport vehicle 108a, an identifier of the first storage system 118a, and a second optimal path to reach a location of the first operator station 106a from a location of the first storage system 118a. The first and second optimal paths may be defined as a sequence of fiducial markers to be followed by the first transport vehicle 108a. The control server 114 may be configured to control the first transport vehicle 108a to transport the first storage system 118a to the first operator station 106a for the batch picking. In an embodiment, the control server 114 may control the first transport vehicle 108a based on the generated first path plan. For example, the control server 114 may communicate a first command to the first transport vehicle 108a to carry and transport the first storage system 118a to the first operator station 106a. The first command may include details of the first path plan generated by the control server 114.

The control server 114 may further select one or more optimal robotic apparatus from the plurality of robotic apparatus 110 that may collect and transport the requisite inventory items from the first operator station 106a to the order consolidation area 112. The control server 114 may further select the optimal robotic apparatus based on an availability factor of each of the plurality of robotic apparatus 110, a capacity of each of the plurality of robotic apparatus 110, a current location of each of the plurality of robotic apparatus 110, or the like. In one example, the control server 114 may determine that the first and second robotic apparatus 110a and 110b are located nearest to the first operator station 106a and are currently available. In such a scenario, the control server 114 may select the first and second robotic apparatus 110a and 110b to collect and transport the requisite inventory items from the first operator station 106a to the order consolidation area 112. In another example, the control server 114 may determine that a third robotic apparatus 110c of the plurality of robotic apparatus 110 is located nearest to the first operator station 106a and is currently available, however the load capacity of the third robotic apparatus 110c is insufficient to collect the requisite inventory items from the first operator station 106a. In such a scenario, the control server 114 may identify a second nearest robotic apparatus that is not only currently available but also has the load capacity to handle the requisite inventory items. In a non-limiting example, it is assumed that the control server 114 selects the first and second robotic apparatus 110a and 110b for collecting and transporting the requisite inventory items from the first operator station 106a to the order consolidation area 112. Further, the control server 114 may determine a suitable combination of one or more inventory items to be collected by each of the first and second robotic apparatus 110a and 110b from the first operator station 106a. In an embodiment, the combination of the one or more inventory items may be determined based on load capacities of the first and second robotic apparatus 110a and 110b, a compatibility between the inventory items, a sequence in which the inventory items are to be transferred to the order bins at the order consolidation system 113, or the like.

The control server 114 may be configured to generate second and third path plans for the first and second robotic apparatus 110a and 110b, respectively, to collect and transport the requisite inventory items from the first operator station 106a to the order consolidation area 112. The second path plan may be indicative of a third optimal path to reach a location of the first operator station 106a from a current location of the first robotic apparatus 110a, a fourth optimal path to reach a location of the order consolidation area 112 from the first operator station 106a, and identifiers of one or more order bins in which the collected items are to be transferred by the first robotic apparatus 110a. The third and fourth optimal paths may be defined as a sequence of fiducial markers to be followed by the first robotic apparatus 110a. The third path plan may be indicative of a fifth optimal path to reach a location of the first operator station 106a from a current location of the second robotic apparatus 110b, a sixth optimal path to reach a location of the order consolidation area 112 from the first operator station 106a, and identifiers of one or more order bins in which the collected items are to be transferred by the second robotic apparatus 110b. The fifth and sixth optimal paths may be defined as a sequence of fiducial markers to be followed by the second robotic apparatus 110b. In an embodiment, the second and third path plans may further indicate a sequence of the order bins for transferring the collected inventory items.

The control server 114 may be further configured to control the first and second robotic apparatus 110a and 110b to collect and transport the requisite inventory items from the first operator station 106a to the order consolidation area 112. In an embodiment, the control server 114 may control the first and second robotic apparatus 110a and 110b based on the generated second and third path plans, respectively. For example, the control server 114 may communicate a second command that may include the second path plan to the first robotic apparatus 110a. The second command may further include information pertaining to the inventory items that are to be collected by the first robotic apparatus 110a from the first operator station 106a. The control server 114 may further communicate a third command that may include the third path plan to the second robotic apparatus 110b. The third command may be communicated after the second command thereby ensuring that the second robotic apparatus 110b reaches the first operator station 106a after the first robotic apparatus 110a and forms a queue at the first operator station 106a.

The control server 114 may further generate a pick-path plan for the first operator station 106a. The pick-path plan may correspond to a sequence of pick and put (or place) operations performed at the first operator station 106a to execute the batch picking from the first storage system 118a. The control server 114 may be configured to communicate a fourth command indicating the pick-path plan to a display device 202 of the first operator station 106a. The fourth command may indicate the identifier of the first storage system 118a from which inventory items are to be batch picked, a count of units of the inventory items that are to be retrieved, an identifier associated with the first and second robotic apparatus 110a and 110b where the picked units of the inventory items are to be placed, and a sequence of pick and place operations to execute the batch picking from the first storage system 118a. In a scenario, where cumulative order quantity for an inventory item includes a portion for forecasted orders, the fourth command may further include information of a temporary storage bin where the portion of the cumulative order quantity pertaining to the forecasted orders is to be temporarily stored until the forecasted orders convert to actual orders.

As shown in FIG. 2A, based on the first command from the control server 114, the first transport vehicle 108a carries and transports the first storage system 118a, storing the first through third items 204a, 204b, and 204c, from the storage area 104 to the first operator station 106a. Based on the fourth command including the pick-path plan, the display device 202 displays the first through third cumulative order quantities for the first through third items 204a, 204b, and 204c that is to be batch picked from the first storage system 118a. The display device 202 further displays a location where the picked inventory items are to be placed after batch picking. For example, as per a message displayed on the display device 202, five units of the second item 204b are to be retrieved from the first storage system 118a, out of which three units are to be placed on a conveyer belt $C_1$ of a robotic apparatus having the identifier '$R_1$' and two units are to be placed on a temporary storage bin $S_3$ of a temporary storage 206. Herein, the three units of the second item 204b that are to be placed on the conveyer belt $C_1$ correspond to a portion of the second cumulative order quantity that is associated with open orders and the two units of the second item 204b that are to be placed on the temporary storage bin $S_3$ correspond to another portion of the second cumulative quantity that is associated with the forecasted orders. The message further indicates that three units of the third item 204c are to be retrieved from the first storage system 118a and to be placed on a conveyer belt $C_2$ of the robotic apparatus having the identifier $R_1$. Herein, the three units of the third item 204c that are to be placed on the conveyer belt $C_2$ correspond to a portion of the third cumulative order quantity that is associated with open orders. The message further indicates that fourteen units of the first item 204a are to be retrieved from the first storage system 118a, out of which one unit is to be placed on a conveyer belt $C_3$ of a robotic apparatus having the identifier '$R_2$', one unit is to be placed on a conveyer belt $C_4$ of the robotic apparatus having the identifier '$R_2$', and two units are to be placed on a temporary storage bin $S_2$ of the temporary storage 206. In an embodiment, (as shown in FIG. 2A), the message may further indicate that ten units of the first item 204a are to be retrieved pertaining to the parked third order and to be placed on a conveyer belt $C_5$ of the robotic apparatus having the identifier '$R_2$'. In another embodiment, the message may indicate that the ten units of the first item 204a that are retrieved pertaining to the parked third order are to be placed on a conveyer belt $C_6$ of a robotic apparatus having an identifier '$R_3$'. Herein, the two units of the first item 204a that are to be placed on the conveyer belts $C_3$ and $C_4$ correspond to a portion of the first cumulative quantity that is associated with open orders. The two units of the first item 204a that are to be placed on the temporary storage bin $S_2$ correspond to another portion of the first cumulative quantity that is associated with the forecasted orders. The ten units of the first item 204a that are to be placed on the conveyer belt $C_5$ or $C_6$ correspond to another portion of the first cumulative quantity that is associated with the parked or pending orders.

Based on the second and third commands, the first robotic apparatus 110a reaches the location of the first operator station 106a followed by the second robotic apparatus 110b. After the first transport vehicle 108a and the first robotic apparatus 110a reach the first operator station 106a, the first operator 120a may follow the instructions displayed on the display device 202. Following the displayed instructions, five units of the second item 204b are picked by the first operator 120a from the first storage system 118a, from which three units are placed on the conveyer belt $C_1$ of the first robotic apparatus 110a and two units are placed in the temporary storage bin $S_3$. Further, one unit of the third item 204c is picked by the first operator 120a from the first storage system 118a, and placed on the conveyer belt $C_2$ of the first robotic apparatus 110a. Since there is no forecasted order pertaining to the third item 204c, no unit of the third item 204c is placed in the temporary storage 206.

Upon collecting the three units of the second item 204b on the conveyer belt $C_1$ and one unit of the third item 204c on the conveyer belt $C_2$, the first robotic apparatus 110a may determine that collection task is complete. In other words, the control server 114 controls the first robotic apparatus 110a to collect portions of the second and third cumulative order quantities. Subsequently, the first robotic apparatus 110a may travel from the first operator station 106a towards the order consolidation area 112 based on the second command, for consolidation of the open orders.

With reference to FIG. 2B, when the first robotic apparatus 110a vacates its space at the first operator station 106a, the second robotic apparatus 110b occupies the vacated space for collecting requisite items. Following the displayed instructions, fourteen units of the first item 204a are picked by the first operator 120a from the first storage system 118a, from which one unit is placed on the conveyer belt $C_3$, one unit is placed on the conveyer belt $C_4$, and ten units are placed on the conveyer belt $C_5$ of the second robotic apparatus 110b. Remaining two units of the first item 204a are placed by the first operator 120a in the temporary storage bin $S_2$. Upon collecting the '12' units of the first item 204a on the conveyer belts $C_1$, $C_2$, and $C_3$, the second robotic apparatus 110b may determine that collection task is complete. In other words, the control server 114 controls the second robotic apparatus 110b to collect a portion of the first cumulative order quantity that is associated with open orders along with another portion of the first cumulative order quantity that is associated with parked orders. Subsequently, the second robotic apparatus 110b may travel from the first operator station 106a towards the order consolidation area 112 for consolidation of open orders, based on the third command.

After requisite quantity of the first through third items 204a-204c are picked at the first operator station 106a, the control server 114 may be configured to command the first transport vehicle 108a to transport the first storage system 118a to the storage area 104. Order consolidation at the order consolidation area 112 has been described in detail in conjunction with FIGS. 3A-3C.

It will be apparent to a person of ordinary skill in the art that the abovementioned exemplary scenario is for illustrative purposes. In an actual implementation, the actual and forecasted orders may include a larger number of orders for processing.

In another embodiment, the first operator station 106a may include an induction system (not shown) to serve as an intermediate interface between the first operator 120a and the first and second robotic apparatus 110a and 110b. In such an implementation, inventory items that are to be placed on the first and second robotic apparatus 110a and 110b are placed on the induction system, which inducts or transfers the placed inventory items to the first and second robotic apparatus 110a and 110b. The induction system may include one or more induction mechanisms (such a conveyer belts) which enable transfer of the inventory items to the first and second robotic apparatus 110a and 110b. In such a scenario, the second and third path plans of the first and second robotic apparatus 110a and 110b, respectively, may include fiducial markers that ensure correct alignment and placement of the first and second robotic apparatus 110a and 110b in front of the induction system.

Figure 3A:
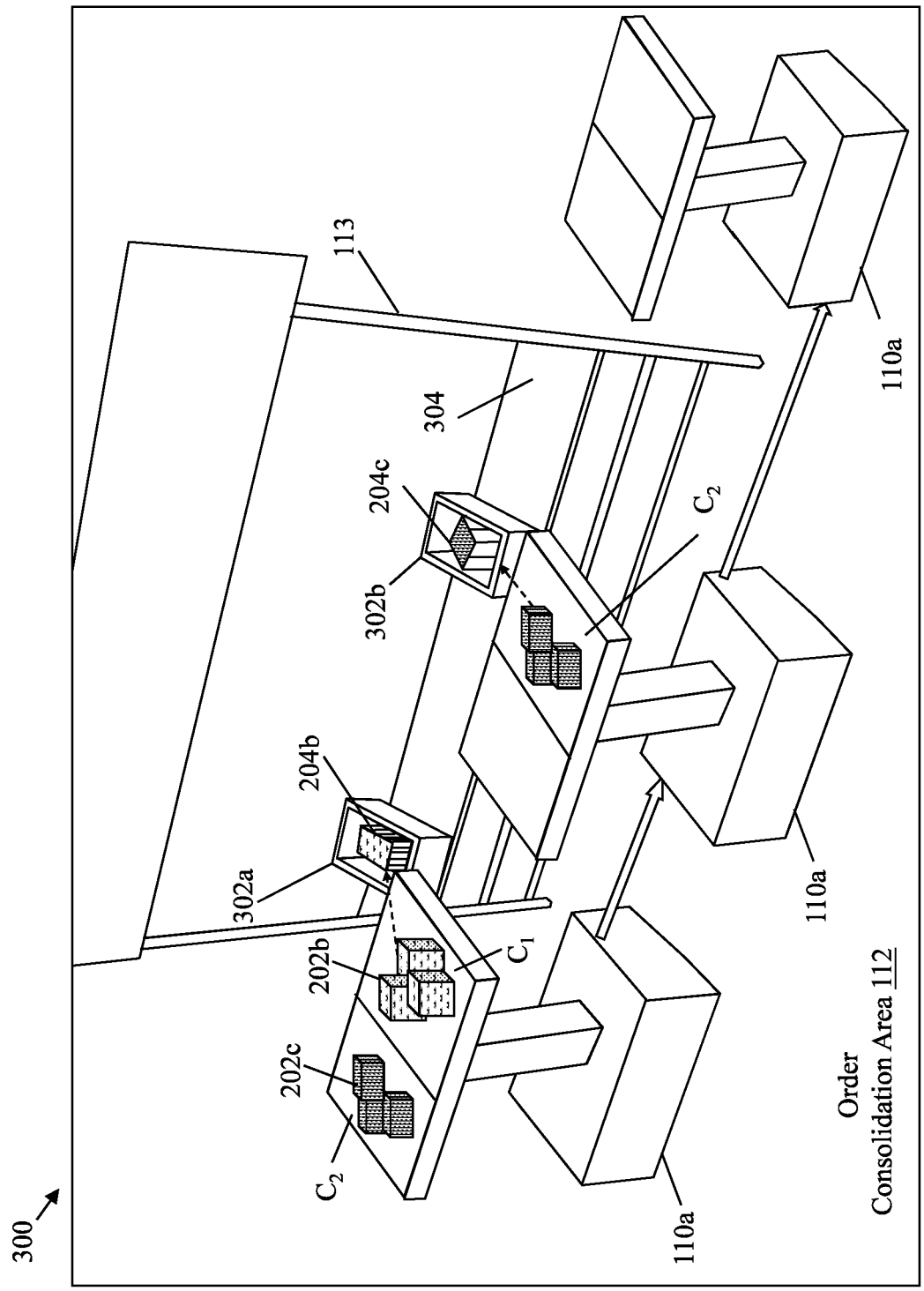
FIGS. 3A-3C are schematic diagrams that collectively illustrate an exemplary scenario for order consolidation, in accordance with another exemplary embodiment of the disclosure.
Figure 3B:
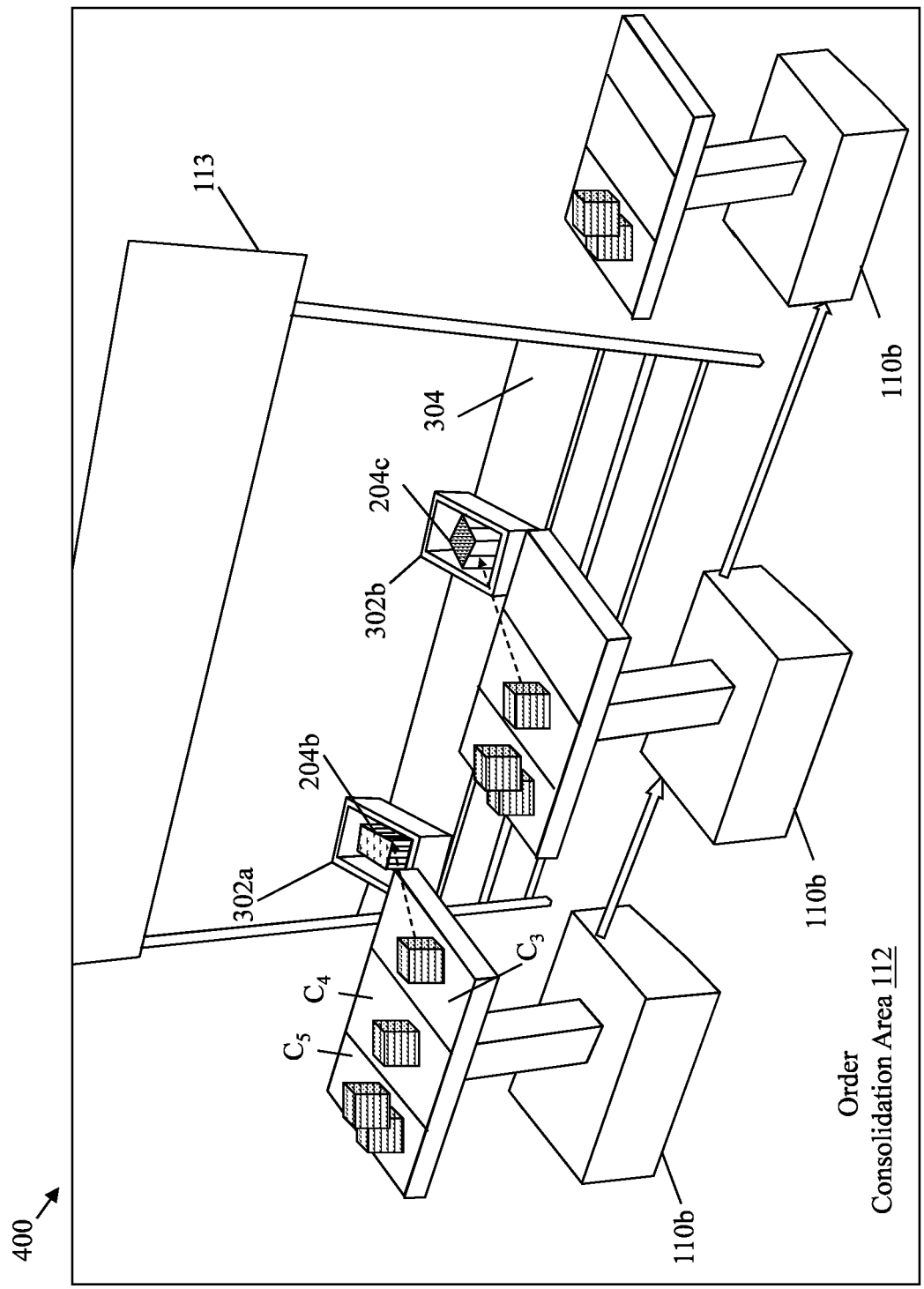
Figure 3C:
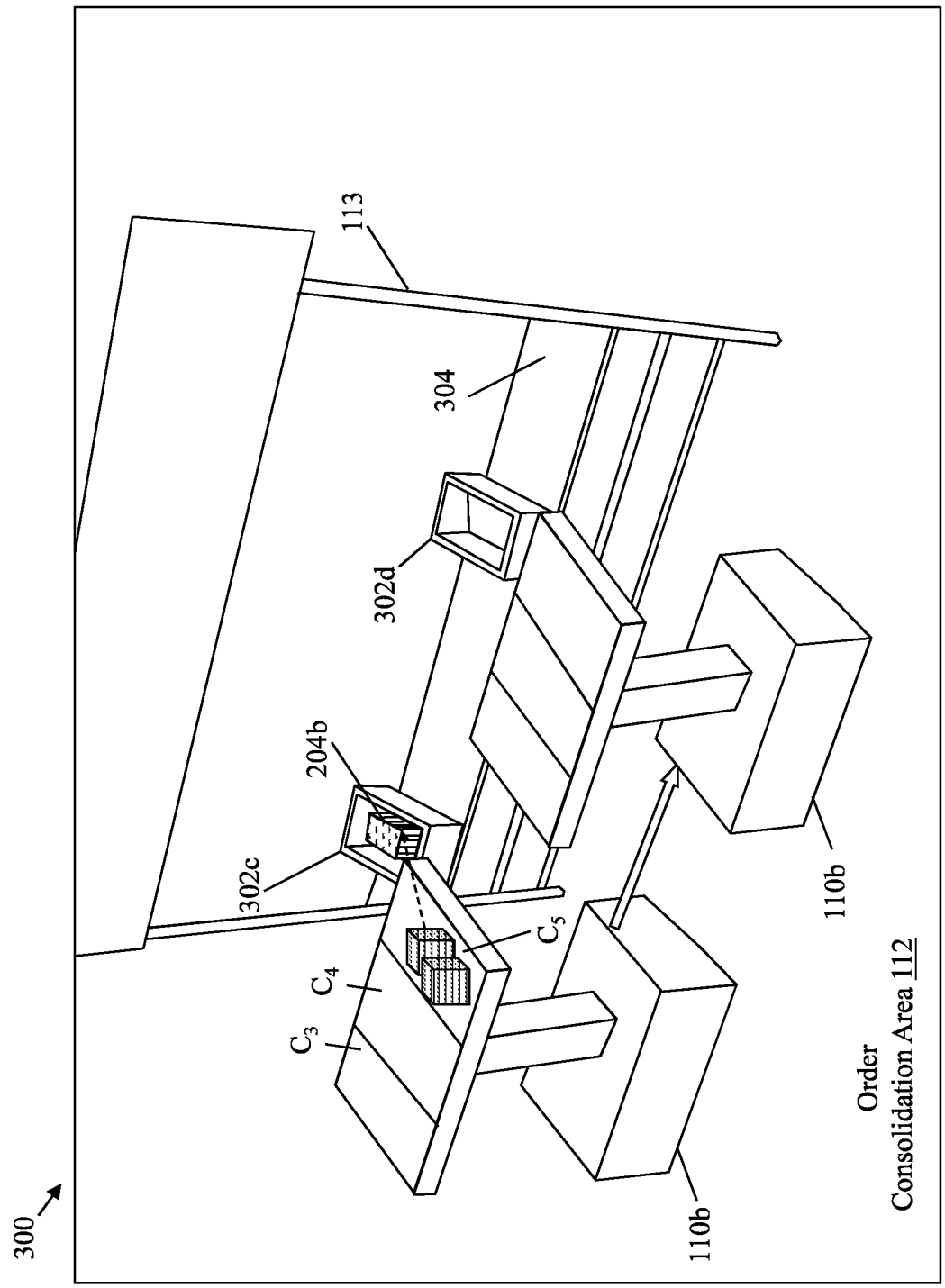

FIGS. 3A-3C are schematic diagrams that illustrate an exemplary scenario 300 for order consolidation at the order consolidation area 112, in accordance with another exemplary embodiment of the disclosure. FIGS. 3A-3C are described in conjunction with FIGS. 1 and 2A-2B.

The order consolidation area 112 may include the order consolidation system 113 where consolidation of inventory items associated with the open orders is executed. In an embodiment, the order consolidation system 113 may have a fixed capacity (e.g., two). In other words, the order consolidation system 113 may be configured to serve a fixed count of orders (i.e., the capacity) at a given time. The order consolidation system 113 may include various storage bins in accordance with the fixed capacity. For example, the order consolidation system 113 in FIG. 3A is shown to have a capacity of two. In other words, at any given point of time, a maximum of two orders may be consolidated simultaneously at the order consolidation system 113 and remaining actual orders remain parked until the ongoing orders are successfully completed. Each order that is being consolidated at the order consolidation system 113 is allocated a unique storage bin for collecting inventory items pertaining to the corresponding order. For example, as shown in FIG. 3A, a first order bin 302a is allocated to the first order and a second order bin 302b is allocated to the second order, that are opened up for consolidation. Since the third order is parked, no order bin is allocated to the third order. Each order bin 302a and 302b may be associated with a unique identifier that enables the plurality of robotic apparatus 110 to identify the corresponding orders. In an embodiment, more than one storage bins may be allocated to a single order based on the quantity of items in the order and the types of items in the order. For example, for an order of three bags of wheat and one bottle of phenyl, the control server 114 may assign two separate storage bins. In an embodiment, the order consolidation system 113 may be equipped with one or more sensors (such as load sensors, image sensors, or the like) to detect transfer of items in the first and second storage bins 302a and 302b. In an embodiment, the order consolidation system 113 may include an induction mechanism 304 on which the first and second storage bins 302a and 302b are placed.

With reference to FIG. 3A, based on the second command received from the control server 114, the first robotic apparatus 110a may transport the inventory items collected from the first operator station 106a to the order consolidation area 112. In one embodiment, the first robotic apparatus 110a may be configured to identify one or more order bins that correspond to the collected items based on the identifiers of the first and second order bins 302a and 302b. For example, in the second command, the control server 114 may have instructed the first robotic apparatus 110a to transfer the items on the conveyer belt $C_1$ to the first order bin 302a and the items on the conveyer belt $C_2$ to the second order bin 302b. In such a scenario, the second path plan of the first robotic apparatus 110a includes fiducial markers that ensure correct alignment and placement of the first robotic apparatus 110a in front of the first order bin 302a and the second order bin 302b.

Accordingly, the first robotic apparatus 110a may be configured to align in front of the first order bin 302a upon reaching the order consolidation area 112 and transfer the items 204b on the conveyer belt $C_1$ to the first order bin 302a based on a selective movement of the conveyer belt $C_1$. Upon the transfer of the items 204b on the conveyer belt $C_1$ to the first order bin 302a, the first robotic apparatus 110a may be configured to align in front of the second order bin 302b and transfer the items 204c on the conveyer belt $C_2$ to the second order bin 302b based on a selective movement of the conveyer belt $C_2$. In other words, the control server 114 controls the first robotic apparatus 110a to transfer portions of the second and third cumulative order quantities that are associated with open orders to the first and second order bins 302a and 302b.

In an embodiment, while the items 204b on the conveyer belt $C_1$ are being transferred to the first order bin 302a, the conveyer belt $C_2$ may remain stationary. In another embodiment, the spatial position of the first and second order bins 302a and 302b may be such that the alignment of the conveyer belt $C_1$ of the first robotic apparatus 110a in front of the first order bin 302a automatically aligns the conveyer belt $C_2$ of the first robotic apparatus 110a in front of the second order bin 302b. In such an embodiment, the items 204b and 204c on the conveyer belts $C_1$ and $C_2$ may be transferred simultaneously to the first and second order bins 302a and 302b, respectively. After the transfer of the items 204b and 204c, the first robotic apparatus 110a becomes available for one or more other tasks.

With reference to FIG. 3B, based on the third command received from the control server 114, the second robotic apparatus 110b may transport the inventory items collected from the first operator station 106a to the order consolidation area 112. In one embodiment, the second robotic apparatus 110b may be configured to identify one or more order bins that correspond to the collected items based on the identifiers of the first and second order bins 302a and 302b. For example, in the third command, the control server 114 may have instructed the second robotic apparatus 110b to transfer the items on the conveyer belt $C_3$ to the first order bin 302a and the items on the conveyer belt $C_4$ to the second order bin 302b. In such a scenario, the third path plan of the second robotic apparatus 110b includes fiducial markers that ensure correct alignment and placement of the second robotic apparatus 110b in front of the first order bin 302a and the second order bin 302b. In other words, the control server 114 controls the second robotic apparatus 110b to transfer the portion of the first cumulative order quantity (i.e., the items on the conveyer belt $C_3$ and the items on the conveyer belt $C_4$) that is associated with the open orders to the first and second order bins 302a and 302b. Accordingly, the second robotic apparatus 110b may be configured to align in front of the first order bin 302a upon reaching the order consolidation area 112 and transfer the items 204a on the conveyer belt $C_3$ to the first order bin 302a based on a selective movement of the conveyer belt $C_3$. Upon the transfer of the items 204a on the conveyer belt $C_3$ to the first order bin 302a, the second robotic apparatus 110b may be configured to align in front of the second order bin 302b and transfer the items 204a on the conveyer belt $C_4$ to the second order bin 302b based on a selective movement of the conveyer belt $C_4$.

In an embodiment, while the items 204a on the conveyer belt $C_3$ are being transferred to the first order bin 302a, the conveyer belt $C_4$ and $C_5$ may remain stationary. In another embodiment, the spatial position of the first and second order bins 302a and 302b may be such that the alignment of the conveyer belt $C_3$ of the second robotic apparatus 110b in front of the first order bin 302a automatically aligns the conveyer belt $C_4$ of the second robotic apparatus 110b in front of the second order bin 302b. In such an embodiment, the items 204a on the conveyer belts $C_3$ and $C_4$ may be transferred simultaneously to the first and second order bins 302a and 302b, respectively, while the conveyer belts $C_5$ remains stationary.

In an embodiment, after the transfer of the items 204a on the conveyer belts $C_3$ and $C_4$, the control server 114 may be configured to instruct the second robotic apparatus 110b to get parked in the order consolidation area 112 until the third order pertaining to the items 204a on the conveyer belt $C_5$ opens up for consolidation at the order consolidation system 113.

In another embodiment, the control server 114 may be configured to utilize the conveyer belts $C_3$ and $C_4$ of the second robotic apparatus 110b to collect more items from the plurality of operator stations 106 until the third order pertaining to the items 204a on the conveyer belt $C_5$ opens up for consolidation at the order consolidation system 113.

After the transfer of the items 204a on the conveyer belts $C_3$ and $C_4$ to the first and second order bins 302a and 302b, the control server 114 may be configured to receive a notification from the order consolidation system 113 that the first and second orders are successfully consolidated. Consequently, the control server 114 may be configured to select a second subset of orders from the received set of orders to be opened up for consolidation at the order consolidation system 113, based on the successful consolidation of the first subset of orders (i.e., the first and second orders). The control server 114 may be further configured to control the order consolidation system 113 to replace the first and second order bins 302a and 302b with new order bins upon the successful consolidation of the first subset of orders to open up the second subset of orders (i.e., the parked orders) for consolidation. In an embodiment, the order consolidation system 113 may include a conveyer mechanism that conveys the first and second order bins 302a and 302b to a packaging area to create space for new storage bins.

In another embodiment, not all orders in the first subset of orders may be successfully consolidated at the same time. In such an embodiment, the control server 114 may be configured to select one or more orders from the second subset of orders to be opened up for consolidation at the order consolidation system 113 based on successful consolidation of one or more orders of the first subset of orders. For example, if the first order is successfully consolidated while the second order is still not complete, the control server 114 may open up the third order for consolidation by replacing the first order bin 302a with a new order bin, while the second order bin 302b remains at the order consolidation system 113. In other words, the control server 114 may control the order consolidation system 113 to replace one or more order bins of the first set of order bins with one or more new order bins upon the successful consolidation of the one or more orders of the first subset of orders. The one or more order bins that are replaced are associated with the one or more orders of the first subset of orders that are successfully consolidated.

With reference to FIG. 3C, the first and second order bins 302a and 302b have been replaced with third and fourth order bins 302c and 302d, respectively. The control server 114 may open the third order and a fourth order (new order) for consolidation at the order consolidation system 113. The control server 114 may further assign the third order to the third order bin 302c and the fourth order to the fourth order bin 302d. The control server 114 may further control the second robotic apparatus 110b that was parked in the order consolidation area 112 to transfer the items 204a on the conveyer belt $C_5$ to the third order bin 302c. Accordingly, the second robotic apparatus 110b may be configured to align in front of the third order bin 302c and transfer the items 204a on the conveyer belt $C_5$ to the third order bin 302c based on a selective movement of the conveyer belt $C_5$. Upon the transfer of the items 204a on the conveyer belt $C_5$ to the third order bin 302c, the second robotic apparatus 110b may become available for one or more other tasks. In other words, the control server 114 controls the second robotic apparatus 110b to transfer the remaining portion of the first cumulative order quantity (i.e., the items on the conveyer belt $C_5$) that is associated with the previously parked orders to the third order bin 302c when the third order opens for consolidation at the order consolidation system 113.

FIG. 4 is a schematic diagram that illustrates another exemplary scenario 400 for batch-picking of inventory items at the second operator station 106b, in accordance with another exemplary embodiment of the disclosure. The robotic operator 120b performs similar operations for batch-picking as performed by the first operator 120a in the foregoing description of FIGS. 2A and 2B.

As shown in FIG. 4, the third and fourth robotic apparatus 110c and 110d are waiting at the second operator station 106b in a queue for collecting requisite inventory items. Further, the second and third transport vehicles 108b and 108c, lifting the second and third storage systems 118b and 118c respectively, have formed a queue at the second operator station 106b. In an example, the control server 114 may have communicated a command to the robotic operator 120b to pick one unit of an item 402a from the second storage system 118b, and place it on a conveyer belt 404a ($C_6$) of the third robotic apparatus 110c. The command may further control the robotic operator 120b to pick two units of an item 402b from the second storage system 118b, and place one on a conveyer belt 404b ($C_7$) of the third robotic apparatus 110c and the other unit on a shelf 406 ($S_3$) of a temporary storage 408. The control server 114 may further allocate one or more peripheral tasks to the robotic operator 120b along with order consolidation. For example, the command may further control the robotic operator 120b to pick two damaged items 410 from the temporary storage 408 and place it on a conveyer belt 404c ($C_8$) of the third robotic apparatus 110c.

As per the command received by the robotic operator 120b from the control server 114, the robotic operator 120b may be configured to pick one unit of the item 402a from the second storage system 118b, and place it on the conveyer belt 404a of the third robotic apparatus 110c waiting at the second operator station 106b for item collection. The robotic operator 120b may be further configured to pick two units of the item 402b from the second storage system 118b, and place one unit of the item 402b on the conveyer belt 404b of the third robotic apparatus 110c and the other unit of the item 402b in the storage shelf 406. The robotic operator 120b may be further configured to pick the two damaged items 410 from the temporary storage 408 and place it on the conveyer belt 404c of the third robotic apparatus 110c as a part of peripheral task allocated to the third robotic apparatus 110c.

After the robotic operator 120b has retrieved the required inventory items from the second storage system 118b, the second transport vehicle 108b may receive a command to carry and transport the second storage system 118b to the storage area 104. Upon collecting the requisite units of the items 402a and 402b and the damaged items 410, the third robotic apparatus 110c may travel from the second operator station 106b towards the order consolidation area 112 for consolidation of open orders. Order consolidation at the order consolidation area 112 is executed in a similar manner as described in the foregoing description of FIGS. 3A-3C.

After the second transport vehicle 108b carrying the second storage system 118b leaves the second operator station 106b, the third transport vehicle 108c waiting in the queue occupies the vacated position of the second transport vehicle 108b. Similarly, after the third robotic apparatus 110c leaves the second operator station 106b, the fourth robotic apparatus 110d waiting in the queue occupies the vacated position of the third robotic apparatus 110c. The robotic operator 120b may be further configured to execute multiple batch-picking operations with regard to the third storage system 118c.

It will be apparent to a person of ordinary skill in the art that items (e.g., the item 402b) stored in the temporary storage 408 may be collected by one or more robotic apparatus of the plurality of robotic apparatus 110 upon conversion of the forecasted orders to actual orders. Further, the temporary storage 408 shown in FIG. 4 is merely an example. Different types of storage systems such as bins, totes, multi-tier racks, pallet racks, shelves, mobile shelves, mezzanine floors, vertical lift modules, horizontal carousels, conveyors, vertical carousels, or the like may be used to realize the temporary storage 408 or 206 (as shown in FIGS. 2A-2B).

Figure 5:
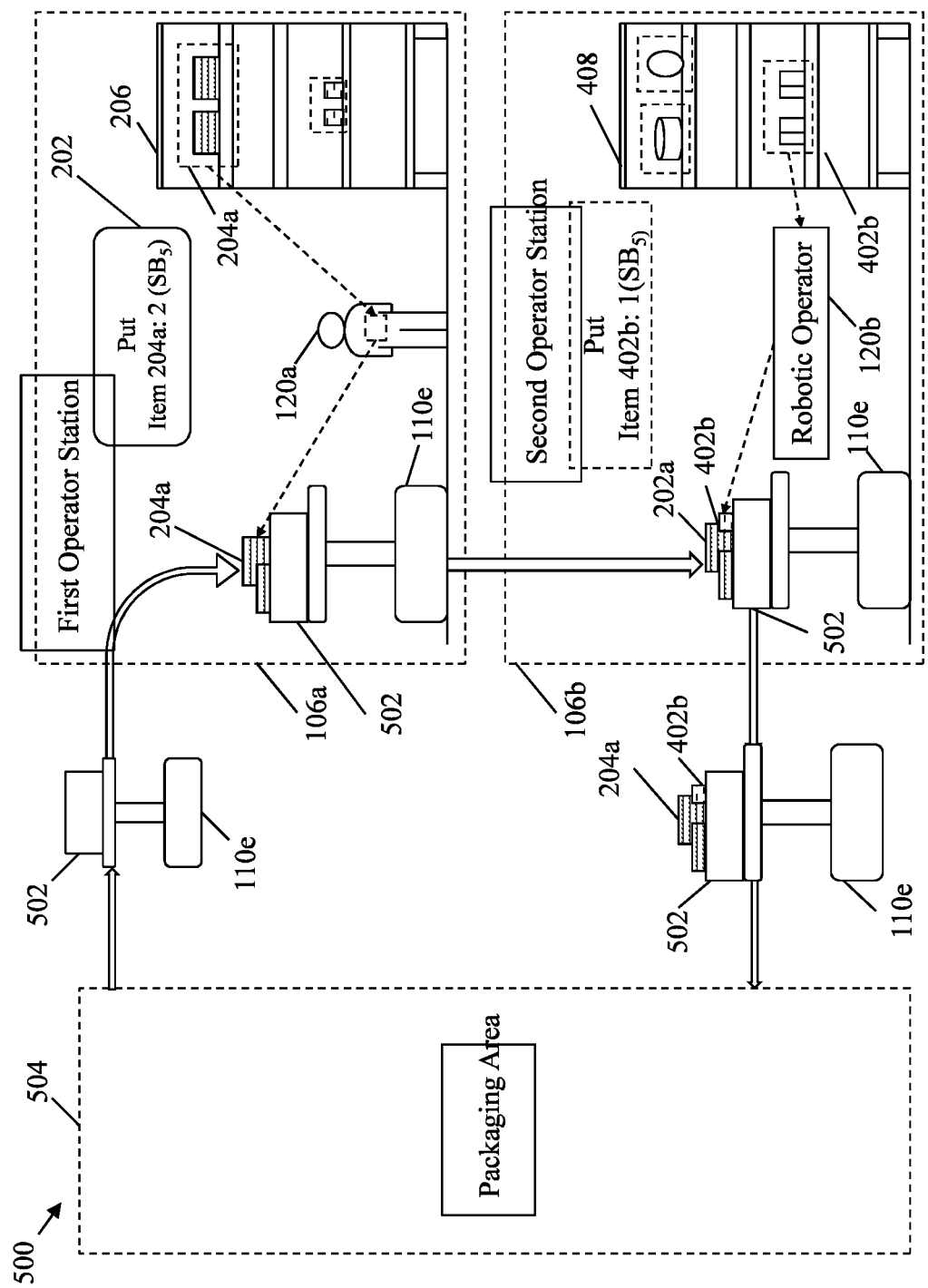
FIG. 5 is a schematic diagram that illustrates another exemplary scenario for order consolidation, in accordance with another exemplary embodiment of the disclosure.

FIG. 5 is a schematic diagram that illustrates another exemplary scenario 500 for order consolidation, in accordance with another exemplary embodiment of the disclosure. In an embodiment, the exemplary scenario 500 may be implemented in the storage facility 102 to increase an order consolidation capacity of the storage facility 102. For example, the actual orders that are parked due to capacity constraint of the order consolidation system 113 may be consolidated by implementing the exemplary scenario 500. In another embodiment, the exemplary scenario 500 may be implemented in a storage facility that does not have a dedicated order consolidation area. FIG. 5 has been described in conjunction with FIGS. 2A-2B and 4.

For consolidating a fourth actual order dynamically, the control server 114 may be configured to select a fifth robotic apparatus 110e from the plurality of robotic apparatus 110 for dynamic order consolidation. The control server 114 may communicate a fifth command to the fifth robotic apparatus 110e to collect a fifth order bin 502 allocated to the fourth order. The control server 114 may further control the fifth robotic apparatus 110e to carry and transport the fifth order bin 502 to the first and second operator stations 106a and 106b where the batch picking of inventory items pertaining to the fourth order is performed.

In one embodiment, the fourth order may correspond to a forecasted order that has converted to an actual order. In such a scenario, batch picking of the inventory items pertaining to the fourth order may have been performed already at the first and/or second operator stations 106a and 106b, and the batch picked items may be temporarily stored at the temporary storages 206 and 408 of the first and/or second operator stations 106a and 106b. In another embodiment, the fourth order may correspond to an actual order that was not forecasted. In such a scenario, the batch picking of the items pertaining to the fourth order may be performed at the time of order consolidation. For the sake of brevity, it is assumed that items (e.g., two units of the first item 204a and one unit of the item 402b) pertaining to the fourth order are already batch picked and stored in the temporary storages 206 and 408 of the first and second operator stations 106a and 106b, respectively.

The control server 114 may be further configured to communicate a sixth command to the fifth robotic apparatus 110e for controlling the fifth robotic apparatus 110e. The sixth command may include a fourth path plan for the fifth robotic apparatus 110e to reach the first operator station 106a from a current location and then travel from the first operator station 106a to the second operator station 106b, and finally travel from the second operator station 106b to a packaging area 504 after consolidation of the fourth order.

Based on the sixth command, the fifth robotic apparatus 110e may be configured to carry the fifth order bin 502 to the first operator station 106a. The control server 114 may be configured to communicate a seventh command to the display device 202 of the first operator station 106a. The display device 202 may display a message indicating the first operator 120a to pick two units of the first item 204a from the temporary storage 206 and put it in the fifth order bin 502 having an identifier as $SB_5$. Based on the displayed message, two units of the first item 204a are picked from the temporary storage 206 and placed in the fifth order bin 502 by the first operator 120a. After collecting the requisite items from the first operator station 106a in the fifth order bin 502, the fifth robotic apparatus 110e may be configured to travel to the second operator station 106b from the first operator station 106a. The control server 114 may be further configured to command the robotic operator 120b to retrieve one unit of the item 402b from the temporary storage 408 and place the retrieved units of the item 402b in the fifth order bin 502. After collecting the item 402b, the fifth robotic apparatus 110e is configured to carry and transport the fifth order bin 502 to the packaging area 504, where final packaging of the fourth order may take place.

It will be apparent to a person of ordinary skill in the art that the first and second operators 120a and 120b may directly retrieve items from any of the plurality of storage systems 118 for placing in the fifth order bin 502.

Figure 6:
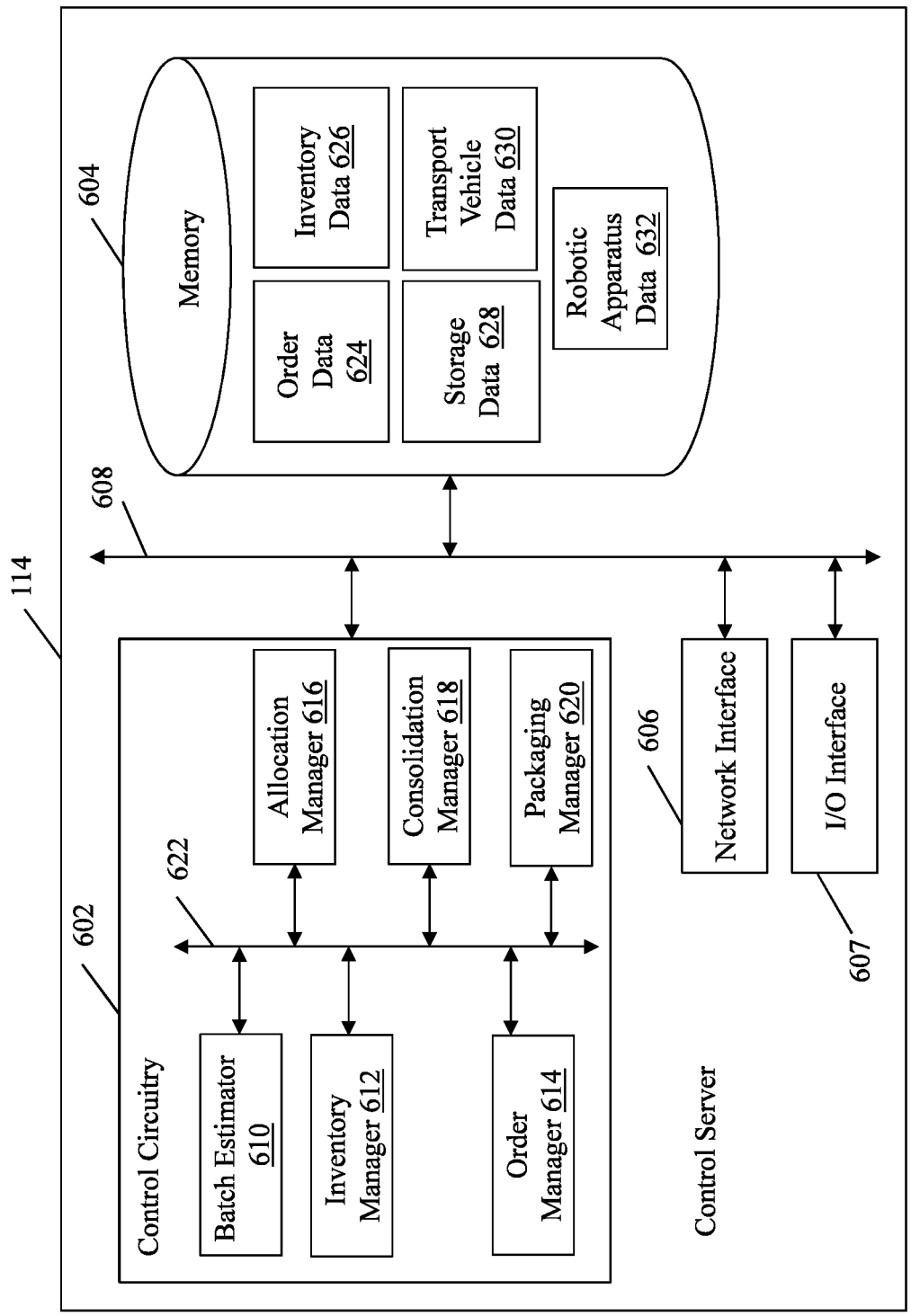
FIG. 6 is a block diagram that illustrates a control server of FIG. 1, in accordance with an exemplary embodiment of the present disclosure.

FIG. 6 is a block diagram that illustrates the control server 114 of FIG. 1, in accordance with an exemplary embodiment of the present disclosure. The control server 114 may include control circuitry 602, a memory 604, a network interface 606, and an input/output (I/O) interface 607 that communicate with each other by way of a first communication bus 608. The control circuitry 602 may include a batch estimator 610, an inventory manager 612, an order manager 614, an allocation manager 616, a consolidation manager 618, and a packaging manager 620 that communicate with each other by way of a second communication bus 622. It will be apparent to a person having ordinary skill in the art that the control server 114 is for illustrative purposes and not limited to any specific combination or hardware circuitry and/or software.

The control circuitry 602 may include suitable logic, instructions, circuitry, interfaces, and/or codes for executing various operations, such as inventory or storage facility management operations, procurement operations, or the like. Examples of the control circuitry 602 may include, but are not limited to, an application-specific integrated circuit (ASIC) processor, a reduced instruction set computing (RISC) processor, a complex instruction set computing (CISC) processor, a field-programmable gate array (FPGA), and the like. The control circuitry 602 may be configured to perform various inventory management or order processing operations. Examples of the inventory management or order processing operations may include determination of the first through third cumulative order quantities based on the set of orders, selection of the first subset of orders from the set of orders to be opened up for consolidation at the order consolidation system 113, identification of optimal storage systems for batch picking, and generation of pick-path plans for the plurality of operator stations 106 and path plans for the plurality of transport vehicles and robotic apparatus 108 and 110. For processing the set of orders, the control circuitry 602 may be further configured to control the plurality of transport vehicles and robotic apparatus 108 and 110 and perform one or more operations as described in the foregoing descriptions of FIGS. 2A-2B, 3A-3C, 4, and 5.

The memory 604 may include suitable logic, instructions, circuitry, interfaces, and/or codes to store order data 624, inventory data 626, storage data 628, transport vehicle data 630, and robotic apparatus data 632. Examples of the memory 604 may include a random-access memory (RAM), a read-only memory (ROM), a programmable ROM (PROM), an erasable PROM (EPROM), a removable storage drive, a hard disk drive (HDD), a flash memory, a solid-state memory, and the like. In some embodiments, a set of centralized or distributed network of peripheral memory devices may be interfaced with the control server 114, as an example, on a cloud server.

The order data 624 may include historical order information and current order information pertaining to each inventory item stored in the storage facility 102. The historical order information may correspond to details (e.g., product information such as, product descriptions, attributes, locations, and/or order quantities) of a plurality of orders received by the control server 114 in the past. The current order information may correspond to details of actual orders that are either being consolidated or pending consolidation. The order data 624 may further include a number of orders placed in the past, a current number of orders received by the control server 114, and a number of orders expected to be received by the control server 114 for each of inventory item.

The inventory data 626 may include a list of inventory items and corresponding stock-keeping units (SKUs) stored in the storage facility 102 and a number of units of each inventory item stored in the storage facility 102. An SKU for an inventory item may be a unique code that is physically readable, electronically readable, or both by a plurality of image sensors. For example, an SKU may be a bar code, a passive printable or attachable radio frequency (RF) tag, a QR code, and the like. The inventory data 626 may further include real time locations of the inventory items included in the corresponding storage systems 118.

The storage data 628 may be indicative of the associations between the SKUs and the plurality of storage systems 118. The storage data 628 may include details of the SKUs stored in each storage system of in the storage area 104. As described in the foregoing, each storage system 118 may be associated with an identifier. Based on the storage data 628, the control server 114 is aware of the storage locations of the inventory items stored in the plurality of storage systems 118.

The transport vehicle data 630 may be indicative of details of the plurality of transport vehicles 108 present in the storage facility 102. The details may include a size, dimensions, a payload capacity, a maximum and minimum speed of a transport vehicle, or the like. The details may further include an identifier (such as a numeric or an alpha-numeric code) associated with each of the plurality of transport vehicles 108, real-time information such as a real-time location, an indicator that indicates whether the transport vehicle is carrying a storage system, a weight of the storage system, or the like.

The robotic apparatus data 632 may be indicative of details of the plurality of robotic apparatus 110 present in the storage facility 102. The details may include a size, dimensions, a payload capacity, a maximum and minimum speed of a robotic apparatus, a count of conveyer belts, or the like. The details may further include an identifier (such as a numeric or an alpha-numeric code) associated with each of the plurality of robotic apparatus 110, real-time information such as a real-time location, an indicator that indicates whether the robotic apparatus is allocated any order processing or peripheral task or the like.

The network interface 606 may include suitable logic, circuitry, and interfaces that may be configured to establish and enable a communication between the control server 114 and different components of the system environment 100, via the communication network 116. The network interface 606 may be implemented by use of various known technologies to support wired or wireless communication of the control server 114 with the communication network 116. The network interface 606 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, and a local buffer circuit.

The I/O interface 607 may comprise suitable logic, circuitry, interfaces, and/or code that may be configured to receive inputs (e.g., orders) and transmit server outputs via a plurality of data ports in the control server 114. The I/O interface 607 may comprise various input and output data ports for different I/O devices. Examples of such I/O devices may include, but are not limited to, a touch screen, a keyboard, a mouse, a joystick, a microphone, an image-capture device, a liquid crystal display (LCD) screen and/or a speaker.

The control circuitry 602 may be configured to perform the inventory or storage facility management operations by way of the batch estimator 610, the inventory manager 612, the order manager 614, the allocation manager 616, the consolidation manager 618, and the packaging manager 620. The batch estimator 610 may estimate cumulative order quantities for various inventory items associated with the actual orders and forecasted orders. For example, the batch estimator 610 may estimate the first through third cumulative order quantities of the first through third inventory items 204a, 204b, and 204c. The inventory manager 612 may eb configured to manage the inventory data 626 stored in the memory 604. For example, the inventory manager 612 may add new SKUs to the inventory data 626 when the new items are stored in the storage area 104 and update the inventory data 626 whenever there is any change in regards to the items stored in the storage area 104.

The order manager 614 may processes all order requests received from the external communication server. The order manager 614 may identify, based on the order requests, inventory items pertinent to the order requests. The order manager 614 may further identify the plurality of storage systems 118 that store the inventory items associated with the order requests. The order manager 614 may further communicate the pick-path plans to the plurality of operator stations 106. In one embodiment, when the storage facility 102 does not have all inventory items specified in an order, the order manager 614 may queue the order for a specific-time interval until the storage facility 102 receives all the inventory items specified in the order. In one embodiment, the order manager 614 may merge various orders (such as the first and second orders) to optimize fulfillment of the order requests. The order manager 614 may further communicate details of the received orders to the batch estimator 610, the consolidation manager 618, and the packaging manager 620.

The allocation manager 616 may manage the storage data 628 and the transport vehicle data 630. For example, if there is any change in the arrangement of the plurality of storage systems 118, the allocation manager 616 may update the storage data 628 based on the change in the arrangement. The allocation manager 616 may determine optimal transport vehicles, optimal storage systems, optimal robotic apparatus, and optimal operator stations. The allocation manager 616 may further handle the allocation of the plurality of transport vehicles 108 to the payloads (such as the plurality of storage systems 118). For example, the allocation manager 616 may determine that the first transport vehicle 108a is available to transport the first storage system 118a, and, thus, allocates the first transport vehicle 108a to the first storage system 118a.

The consolidation manager 618 may manage the robotic apparatus data 632. For example, the consolidation manager 618 may determine an optimal robotic apparatus for commencing consolidation of one or more orders. Further, the consolidation manager 618 may determine an optimal storage bin based on the size and quantity of the inventory items included the order.

The packaging manager 620 may receive the details of the current orders from the order manager 614. The packaging manager 620 may further utilize the robotic apparatus data 632 to assure a final packaging of the order. The packaging manager 620 may further communicate to the order manager 614 when packaging of an order is finished.

Figure 7A:
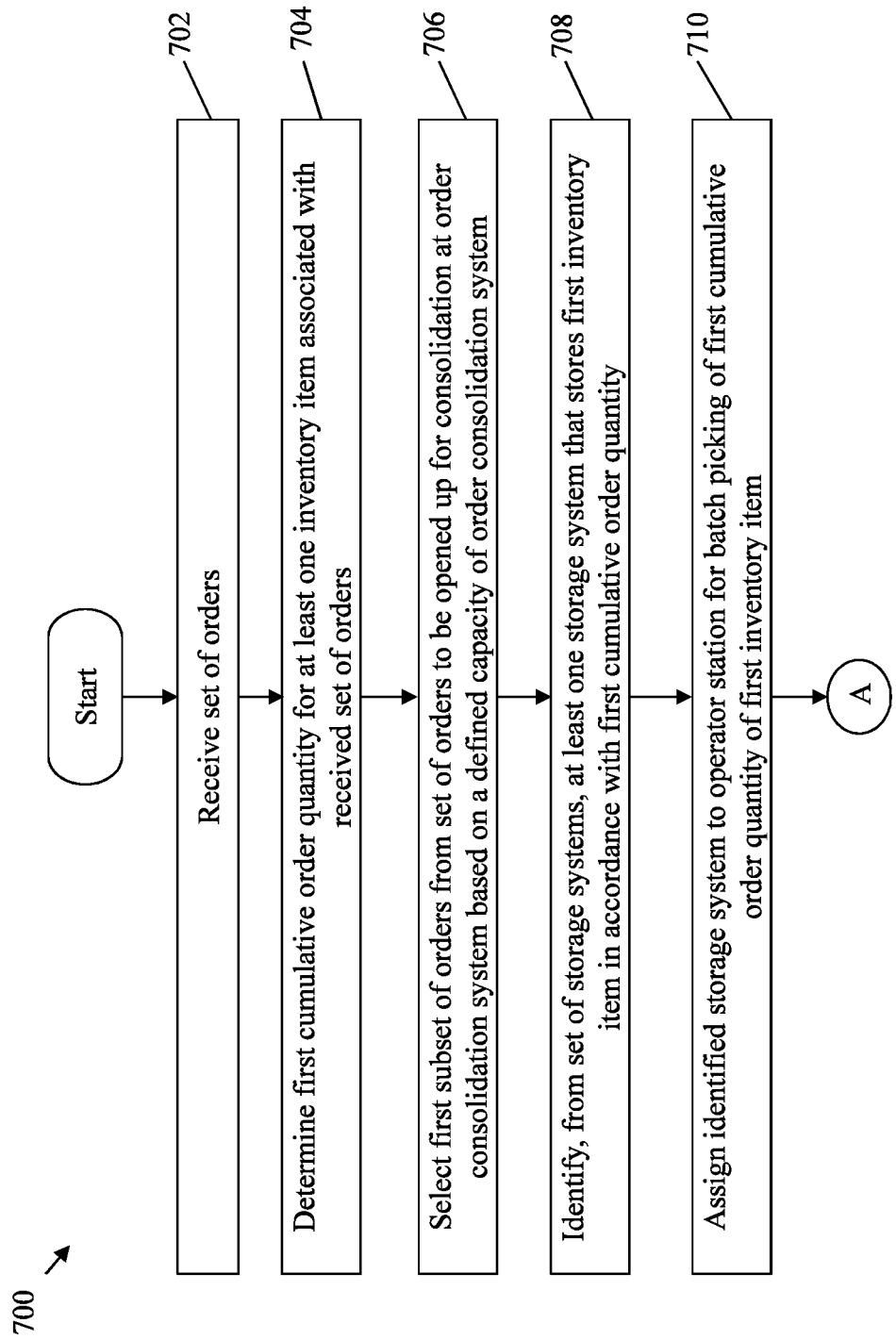
FIGS. 7A-7C, collectively, represent a flow chart that illustrates a process for dynamic order consolidation, in accordance with an exemplary embodiment of the disclosure.
Figure 7B:
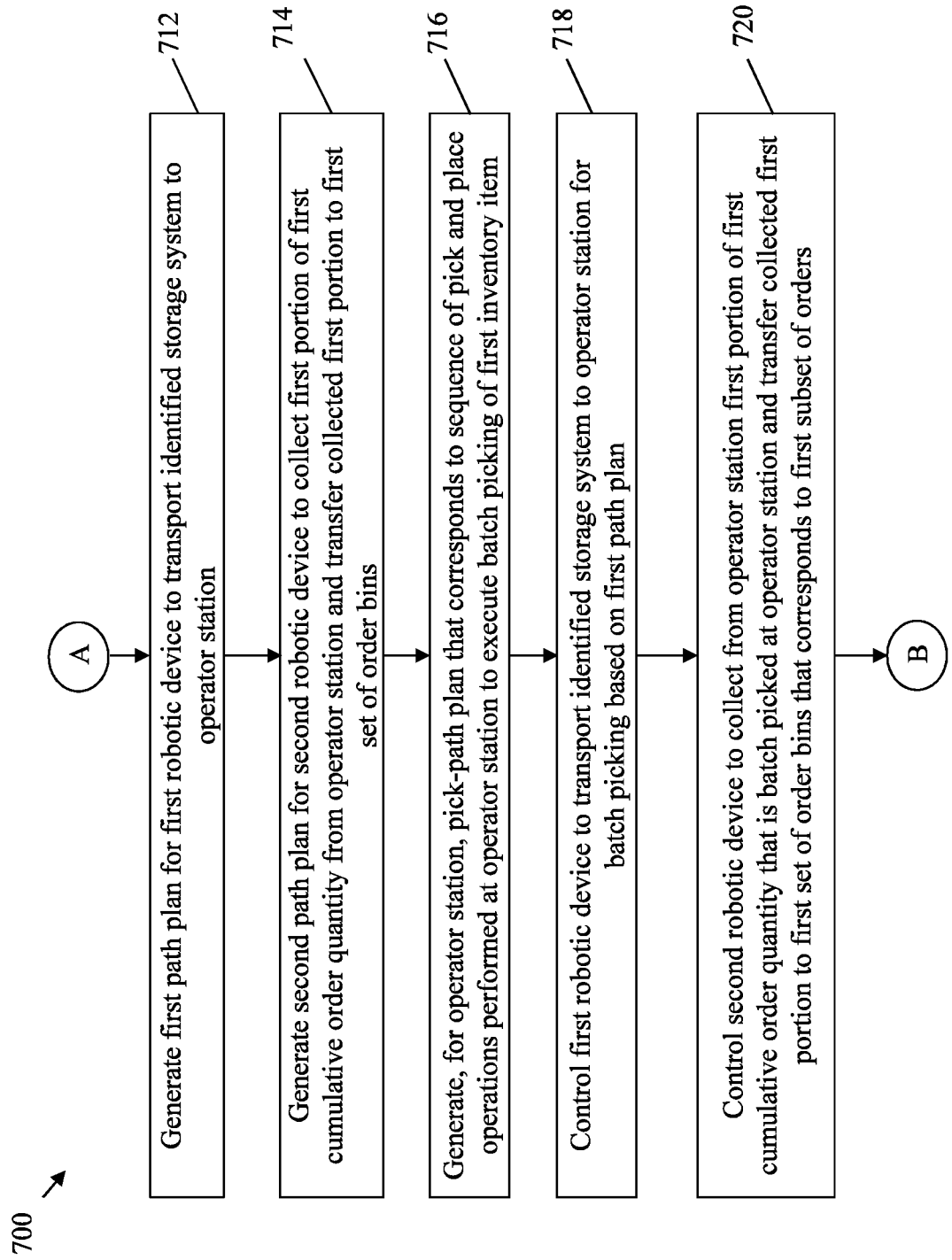
Figure 7C:
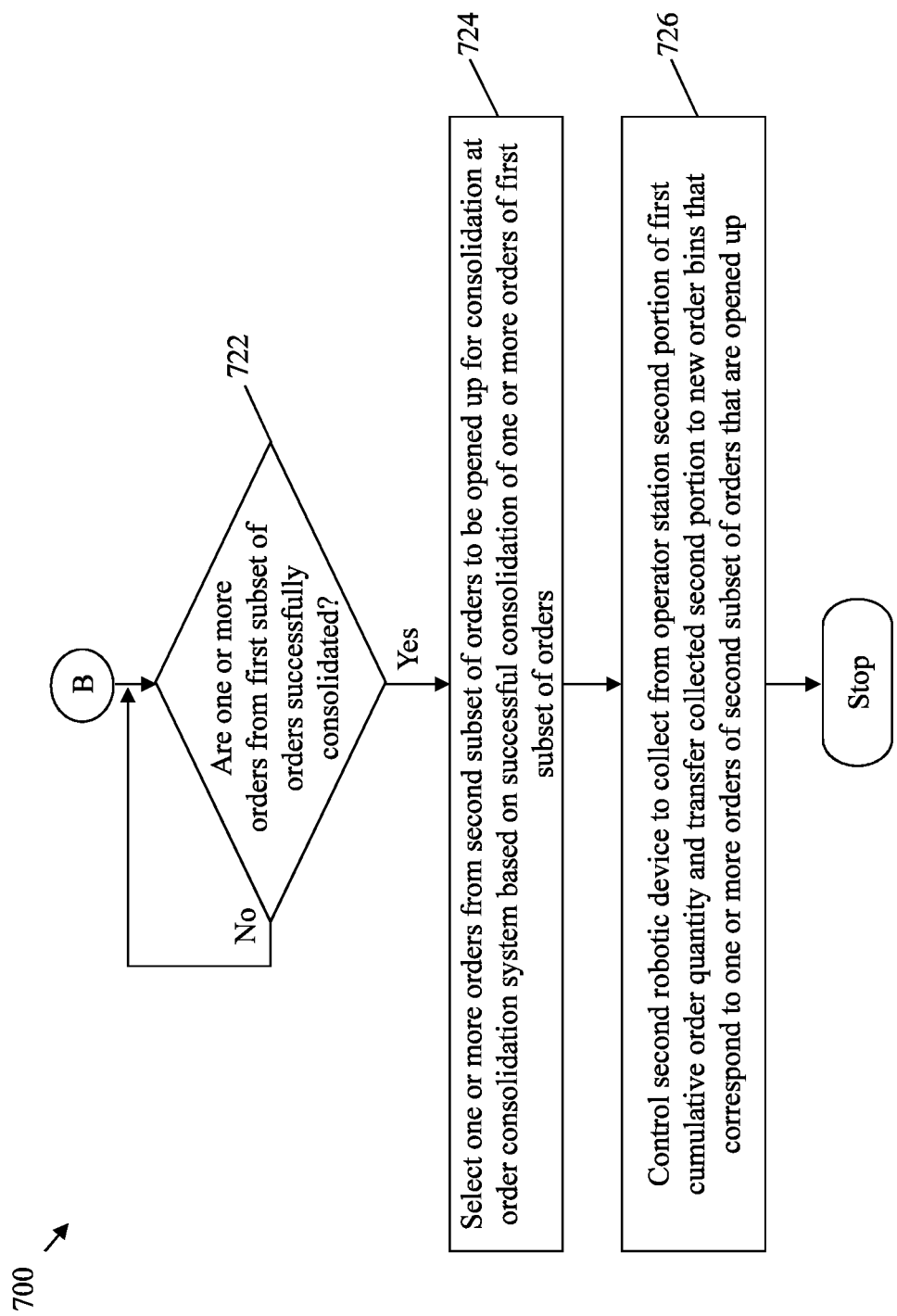

FIGS. 7A-7C, collectively, represent a flowchart 700 that illustrates a process (e.g., method) for order processing, in accordance with an exemplary embodiment of the disclosure. In some embodiments, the process is performed by the control server 114. FIGS. 7A-7CB are explained in conjunction with FIGS. 2, 3, and 4.

Referring to FIG. 7A, the process may generally start at step 702, where the control server 114 receives the set of orders for the first inventory item. The process proceeds to step 704, where the control server 114 determines the first cumulative order quantity for the first inventory item associated with the received set of orders. The process proceeds to step 706, where the control server 114 selects the first subset of orders from the set of orders to be opened up for consolidation at the order consolidation system 113 based on the defined capacity of the order consolidation system 113. The process proceeds to step 708, where the control server 114 identifies, from the plurality of storage systems 118, at least one storage system 118a that stores the first inventory item in accordance with the first cumulative order quantity. The process proceeds to step 710, where the control server 114 assigns the first storage system 118a to one operator station 106a of the plurality of operator stations 106 for batch picking of the first cumulative order quantity of first inventory item. In a scenario, where the set of orders is further associated with a second inventory item and the first storage system 118a stores the second inventory item in accordance to a second cumulative order quantity of the second inventory item, the control server 114 further assigns the batch picking of the second cumulative order quantity of the second inventory item to the same operator station 106a. The process proceeds to process A.

With reference to FIG. 7B, the process A proceeds to step 712, where the control server 114 generates the first path plan for the first transport vehicle 108a (i.e., a first robotic device) to transport the first storage system 118a to the first operator station 106a. The process proceeds to step 714, where the control server 114 generates the second path plan for the second robotic apparatus 110b (i.e., a second robotic device) to collect a first portion of the first cumulative order quantity from the first operator station 106a and transfer the collected first portion to the first set of order bins 302a and 302b. The first portion of the first cumulative order quantity corresponds to the first subset of orders that is opened at the order consolidation system 113. In an embodiment, the second path plan may be further generated for the collection of a second portion of the first cumulative order quantity from the first operator station 106a by the second robotic apparatus 110b and transfer of the collected second portion to new order bins. The second portion of the first cumulative order quantity corresponds to the second subset of orders that are currently pending and will be opened at the order consolidation system 113 after successful consolidation of the first subset of orders.

The process proceeds to step 716, where the control server 114 generates, for the first operator station 106a, the pick-path plan that corresponds to sequence of pick and place operations performed at the first operator station 106a to execute the batch picking of the first inventory item. The process proceeds to step 718, where the control server 114 controls the first transport vehicle 108a (i.e., the first robotic device) to transport the first storage system 118a to the first operator station 106a for batch picking based on the first path plan. The process proceeds to step 720, where the control server 114 controls the second robotic apparatus 110b (i.e., the second robotic device) to collect from the first operator station 106a the first portion of the first cumulative order quantity that is batch picked at the first operator station 106a and transfer the collected first portion to the first set of order bins 302a and 302b that corresponds to the first subset of orders. Under the control of the control server 114, the second robotic apparatus 110b (i.e., the second robotic device) collects the first portion of the first cumulative order quantity from the first operator station 106a and transfers the collected first portion to the first set of order bins 302a and 302b that corresponds to the first subset of orders.

In an embodiment, the control server 114 further controls the second robotic apparatus 110b (i.e., the second robotic device) to collect from the first operator station 106a the second portion of the first cumulative order quantity along with the first portion and transfer the collected second portion to the new order bins. In such an embodiment, after the transfer of the collected first portion to the first set of order bins 302a and 302b, the second robotic apparatus 110b gets parked at the order consolidation area 112 until the control server 114 opens up the second subset of orders at the order consolidation system 113. In another embodiment, the control server 114 may control another robotic apparatus to collect from the first operator station 106a the second portion of the first cumulative order quantity that is batch picked at the first operator station 106a and transfer the collected second portion to the new order bins. The process proceeds to process B.

With reference to FIG. 7C, the process B proceeds to step 722, where the control server 114 determines whether one or more orders of the first subset of orders are successfully consolidated. If at the step 722, the control server 114 determines that none of the first subset of orders is consolidated, the control server 114 waits for the one or more orders of the first subset of orders to get consolidated and the process waits at step 722. If at the step 722, the control server 114 determines that one or more orders of the first subset of orders are consolidated, the process proceeds to step 724. At step 724, the control server 114 selects one or more orders from the second subset of orders to be opened up for consolidation at the order consolidation system 113 based on the successful consolidation of the one or more orders of the first subset of orders. The process proceeds to step 726, the control server 114 further controls the second robotic apparatus 110b (i.e., the second robotic device) to collect from the first operator station 106a the second portion of the first cumulative order quantity and transfer the collected second portion to the new order bins that correspond to the one or more orders of the second subset of orders that are opened up.

In one embodiment, the second robotic apparatus 110b (i.e., the second robotic device) collects from the first operator station the second portion of the first cumulative order quantity and transfers the collected second portion to the new order bins that correspond to the one or more orders of the second subset of orders that are opened up. In another embodiment, under the control of the control server 114, the second robotic apparatus 110b that was parked at the order consolidation area 112 transfers the previously collected second portion to the new order bins (e.g., the third order bin 302c) that correspond to the one or more orders of the second subset of orders that are opened up. The process proceeds to stop when all orders are consolidated.

Therefore, the control server 114 simultaneously facilitates batch picking of inventory items associated with open, parked, and or forecasted orders and transferring of the picked items to order bins at the order consolidation system 113 by the use of the plurality of robotic apparatus 110. In conventional order processing systems, operator stations were mapped to orders, thus requiring transport of one storage system that stores items corresponding to multiple orders across different operator stations. Technological improvements in the control server 114 have enabled the control server 114 to keep the plurality of operator stations 106 independent of order mapping. In addition, the control server 114 ensures that batch-picking of inventory items stored in a single storage system is performed at the same operator station. Due to the batch picking of the cumulative order quantity at the order stations, the need for the plurality of storage systems 118 to be transported across different operator stations is eliminated by the control server 114. As a result, a throughput and efficiency of order processing at the storage facility 102 is increased.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Techniques consistent with the present disclosure provide, among other features, systems and methods for order processing in a storage facility. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

The invention claimed is:
1. An order processing system comprising:
 a plurality of robotic devices;
 a set of storage systems that accommodates a plurality of inventory items;

an order consolidation system having a defined capacity, wherein the order consolidation system comprises a first set of order bins in accordance with the defined capacity; and a control server configured to:
receive a set of orders for a first inventory item of the plurality of inventory items;
determine a first cumulative order quantity of the first inventory item for the set of orders;
select a first subset of orders from the set of orders to be opened up for consolidation at the order consolidation system based on at least the defined capacity of the order consolidation system;
identify, from the set of storage systems, at least one storage system that stores the first inventory item in accordance with the first cumulative order quantity;
assign the identified storage system to an operator station for batch picking of the first cumulative order quantity of the first inventory item from the identified storage system;
control a first robotic device of the plurality of robotic devices to transport the identified storage system to the operator station for the batch picking; and
control a second robotic device of the plurality of robotic devices to collect from the operator station a first portion of the first cumulative order quantity that is batch picked at the operator station and transfer the collected first portion to the first set of order bins, wherein the first portion of the first cumulative order quantity corresponds to the first subset of orders.

2. The order processing system of claim 1, wherein when the storage system further stores a second inventory item and the set of orders is further associated with the second inventory item, a batch picking of a second cumulative order quantity for the second inventory item is executed at the operator station.

3. The order processing system of claim 1, wherein a second subset of orders in the set of orders that is in excess to the defined capacity of the order consolidation system remains pending for consolidation.

4. The order processing system of claim 3, wherein the control circuitry is further configured to select the second subset of orders to be opened up for consolidation at the order consolidation system based on successful consolidation of the first subset of orders.

5. The order processing system of claim 4, wherein the control circuitry is further configured to control the order consolidation system to replace the first set of order bins with a second set of order bins upon the successful consolidation of the first subset of orders to open up the second subset of orders for consolidation at the order consolidation system.

6. The order processing system of claim 5, wherein the control circuitry is further configured to control the second robotic device to collect a second portion of the first cumulative order quantity along with the first portion from the operator station and transfer the second portion of the first cumulative order quantity to the second set of order bins.

7. The order processing system of claim 5, wherein the control server is further configured to control a third robotic device of the plurality of robotic devices to collect a second portion of the first cumulative order quantity from the operator station and transfer the second portion of the first cumulative order quantity to the second set of order bins.

8. The order processing system of claim 3, wherein the control circuitry is further configured to select one or more orders from the second subset of orders to be opened up for consolidation at the order consolidation system based on successful consolidation of one or more orders of the first subset of orders.

9. The order processing system of claim 8, wherein the control circuitry is further configured to control the order consolidation system to replace one or more order bins of the first set of order bins with one or more new order bins upon the successful consolidation of the one or more orders of the first subset of orders, and wherein the one or more order bins that are replaced are associated with the one or more orders of the first subset of orders that are successfully consolidated.

10. The order processing system of claim 1, wherein the control server selects the first subset of orders further based on a priority level associated with each of the set of orders and/or a time of reception of each of the set of orders by the control server.

11. The order processing system of claim 1, wherein the control server selects the first subset of orders further based on an availability of the first inventory item.

12. The order processing system of claim 1, wherein the control server is further configured to generate a first path plan for the first robotic device to transport the identified storage system to the operator station, and wherein the control server controls the first robotic device based on the determined first path plan.

13. The order processing system of claim 1, wherein the control server is further configured to generate a second path plan for the second robotic device to collect the first portion of the first cumulative order quantity from the operator station and transfer the collected first portion to the first set of order bins, and wherein the control server controls the second robotic device based on the determined second path plan.

14. The order processing system of claim 1, wherein the control server is further configured to generate a pick-path plan for the operator station, and wherein the pick-path plan corresponds to a sequence of pick and place operations performed at the operator station to execute the batch picking of the first inventory item from the storage system.

15. The order processing system of claim 1, wherein the order consolidation system is capable of consolidating a first count of orders simultaneously such that the defined capacity equals the first count.

16. An order processing method comprising:
receiving, by a control server, a set of orders for a first inventory item of a plurality of inventory items, wherein the plurality of inventory items are stored in a set of storage systems;
determining, by the control server, a first cumulative order quantity of the first inventory item for the set of orders;
selecting, by the control server, a first subset of orders from the set of orders to be opened up for consolidation at an order consolidation system based on a defined capacity of the order consolidation system;
identify, from the set of storage systems, at least one storage system that stores the first inventory item in accordance with the first cumulative order quantity;
assign the identified storage system to an operator station for batch picking of the first cumulative order quantity of the first inventory item from the identified storage system;
control a first robotic device to transport the identified storage system to the operator station for the batch picking; and
control a second robotic device to collect from the operator station a first portion of the first cumulative order quantity that is batch picked at the operator station and transfer the collected first portion to a first set of order bins, wherein the first portion of the first cumulative order quantity corresponds to the first subset of orders.

17. The order processing method of claim 16, wherein a batch picking of a second cumulative order quantity for a second inventory item is executed at the operator station when the second inventory item is stored in the storage system and the set of orders is associated with the second inventory item.

18. The order processing method of claim 16, wherein after the selection of the first subset of orders, a second subset of orders in the set of orders that is in excess to the defined capacity of the order consolidation system remains pending for consolidation.

19. The order processing method of claim 16, further comprising controlling, by the control server, the second robotic device to collect a second portion of the first cumulative order quantity along with the first portion from the operator station and transfer the second portion of the first cumulative order quantity to a second set of order bins that replace the first set of order bins at the order consolidation system upon successful consolidation of the first subset of orders.

20. The order processing method of claim 16, wherein the first subset of orders is further selected based on a priority level associated with each of the set of orders, a time of reception of each of the set of orders, and/or an availability of the first inventory item, and wherein the order consolidation system is capable of consolidating a first count of orders simultaneously such that the defined capacity equals the first count.

* * * * *